(12) United States Patent
Kondo et al.

(10) Patent No.: US 12,553,019 B2
(45) Date of Patent: Feb. 17, 2026

(54) CONCENTRATION DEVICE AND CONCENTRATION METHOD

(71) Applicant: Murata Manufacturing Co., Ltd., Nagaokakyo (JP)

(72) Inventors: Takashi Kondo, Nagaokakyo (JP); Shunsuke Kitamura, Nagaokakyo (JP); Masamichi Shiko, Nagaokakyo (JP); Takashi Ito, Nagaokakyo (JP); Satoshi Murata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1043 days.

(21) Appl. No.: 17/666,768

(22) Filed: Feb. 8, 2022

(65) Prior Publication Data

US 2022/0162536 A1    May 26, 2022

Related U.S. Application Data

(63) Continuation of application No. PCT/JP2020/027448, filed on Jul. 15, 2020.

(30) Foreign Application Priority Data

Sep. 9, 2019   (JP) .................................. 2019-163759

(51) Int. Cl.
*C12M 1/00* (2006.01)
*B01D 33/01* (2006.01)
(Continued)

(52) U.S. Cl.
CPC ......... *C12M 23/50* (2013.01); *B01D 33/0158* (2013.01); *B01D 33/15* (2013.01); *B01D 33/48* (2013.01); *B01D 33/804* (2013.01); *B01D 39/2027* (2013.01); *C12M 23/44* (2013.01); *C12M 23/46* (2013.01); *C12M 23/48* (2013.01); *C12M 23/58* (2013.01); *C12M 27/02* (2013.01); *C12M 29/04* (2013.01); *C12M 33/14* (2013.01);
(Continued)

(58) Field of Classification Search
None
See application file for complete search history.

(56) References Cited

U.S. PATENT DOCUMENTS 3,481,477 A * 12/1969 Farr ....................... B01D 33/01
                                                          422/918
4,800,020 A *  1/1989 Savas .................... B01D 33/01
                                                          422/535
(Continued)

FOREIGN PATENT DOCUMENTS

CN       203477164 U    3/2014
CN       107823946 A    3/2018
(Continued)

OTHER PUBLICATIONS

International Search Report issued in PCT/JP2020/027448, dated Sep. 24, 2020.

*Primary Examiner* — Holly Kipouros
(74) *Attorney, Agent, or Firm* — ArentFox Schiff LLP

(57) ABSTRACT

A concentration device for concentrating a liquid containing a target object, the concentration device including: a container configured to store the liquid containing the target object; a filter in the container; and a position control portion configured to change a position of the filter in the container.

14 Claims, 29 Drawing Sheets

(51) Int. Cl.
*B01D 33/15* (2006.01)
*B01D 33/48* (2006.01)
*B01D 33/80* (2006.01)
*B01D 39/20* (2006.01)
*C12M 1/06* (2006.01)
*C12M 1/26* (2006.01)
*C12M 1/34* (2006.01)
*C12M 3/00* (2006.01)

(52) U.S. Cl.
CPC ............ *C12M 41/44* (2013.01); *C12M 47/02* (2013.01); *B01D 2201/34* (2013.01); *B01D 2201/4069* (2013.01)

(56) References Cited

U.S. PATENT DOCUMENTS

| | | | |
|---|---|---|---|
| 5,301,685 | A * | 4/1994 | Guirguis ................. B01L 3/502 600/584 |
| 10,569,203 | B2 | 2/2020 | Banju et al. |
| 2009/0238725 | A1 * | 9/2009 | Ellis ........................ B01L 3/502 29/700 |
| 2012/0258459 | A1 * | 10/2012 | Huang .................. B01L 3/5021 210/767 |
| 2014/0110356 | A1 | 4/2014 | McKay |
| 2015/0093362 | A1 * | 4/2015 | Dominguez ........... B01D 33/00 210/329 |
| 2015/0157049 | A1 * | 6/2015 | Fogelin ................ B01D 33/015 210/396 |
| 2018/0171278 | A1 | 6/2018 | Kiyama et al. |
| 2018/0230508 | A1 * | 8/2018 | Idelevich ................ B01L 3/502 |
| 2018/0243672 | A1 * | 8/2018 | Banju ................. B01D 39/2068 |
| 2019/0009197 | A1 | 1/2019 | Banju et al. |
| 2019/0046901 | A1 * | 2/2019 | Boyd .................. B01D 24/4621 |
| 2019/0316173 | A1 * | 10/2019 | Klintstedt ................ C12N 1/20 |
| 2020/0270561 | A1 * | 8/2020 | Marino .................. C12M 37/04 |

FOREIGN PATENT DOCUMENTS

| | | |
|---|---|---|
| GB | 2392854 A | 3/2004 |
| JP | 2010172251 A | 8/2010 |
| JP | 2015012837 A | 1/2015 |
| JP | 2016220590 A | 12/2016 |
| JP | 2019092393 A | 6/2019 |
| WO | 2017037461 A1 | 3/2017 |
| WO | 2017191768 A1 | 11/2017 |
| WO | 2019059279 A1 | 3/2019 |

* cited by examiner

CONCENTRATION DEVICE AND CONCENTRATION METHOD

CROSS REFERENCE TO RELATED APPLICATIONS

The present application is a continuation of International application No. PCT/JP2020/027448, filed Jul. 15, 2020, which claims priority to Japanese Patent Application No. 2019-163759, filed Sep. 9, 2019, the entire contents of each of which are incorporated herein by reference.

FIELD OF THE INVENTION

The present invention relates to a concentration device and a concentration method.

BACKGROUND OF THE INVENTION

For example, Patent Document 1 discloses a method for producing a cell concentrated liquid by allowing a cell suspension to pass through a cell suspension treatment unit filled with a hollow fiber-type separation membrane.

Patent Document 1: Japanese Unexamined Patent Application Publication No. 2015-12837

SUMMARY OF THE INVENTION

However, in the concentration method disclosed in Patent Document 1, there is still room for improvement in terms of reducing a burden on a target object.

An object of the present invention is to provide a concentration device and a concentration method capable of reducing a burden on a target object.

A concentration device according to an aspect of the present invention is a concentration device for concentrating a liquid containing a target object, the concentration device including: a container configured to store the liquid containing the target object; a filter in the container; and a position control portion configured to change a position of the filter in the container.

A concentration method according to an aspect of the present invention is a concentration method for concentrating a liquid containing a target object, the concentration method including the steps of: introducing the liquid containing the target object into a container; moving a filter in the liquid containing the target object; discharging the liquid in the container located on an upper side relative to the filter; and recovering the target object and the liquid in the container.

According to the present invention, a concentration device and a concentration method capable of reducing a burden on a target object can be provided.

DETAILED DESCRIPTION OF THE PREFERRED EMBODIMENTS

Circumstances Leading to Present Invention

Figure 1:
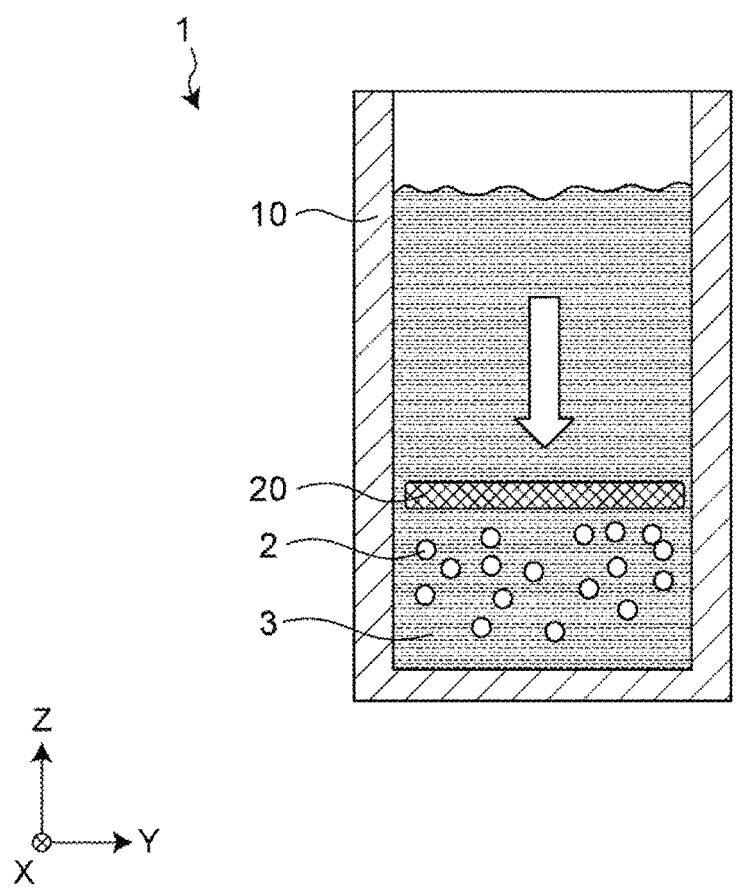
FIG. 1 is a schematic cross-sectional view illustrating a concept of a concentration device of Embodiment 1 according to the present invention.

In the method for producing a cell concentrated liquid disclosed in Patent Document 1, a cell suspension is caused to pass through a cell suspension treatment unit filled with a hollow fiber-type separation membrane from an introduction port, and the cell suspension is concentrated while discharging filtrate.

However, since the cell suspension is caused to pass through the cell suspension treatment unit, strong force is applied to cells, which are target objects. Furthermore, in order to cause the cell suspension to pass through, a pressurizing mechanism or a suction pressure mechanism, such as a pump, is required. In addition, the concentration ratio of the cell suspension cannot be adjusted.

As a result of intensive studies, the present inventors have found that, by moving a filter with respect to a liquid containing a target object stored in a container, the liquid containing the target object is concentrated, and the following invention has been achieved.

A concentration device according to an aspect of the present invention is a concentration device for concentrating a liquid containing a target object, the concentration device including: a container configured to store the liquid containing the target object; a filter in the container; and a position control portion configured to change a position of the filter in the container.

With this configuration, a burden on the target object can be reduced.

The concentration device may include a seal portion between the filter and an inner wall of the container.

With this configuration, passage of the target object between the filter and the inner wall of the container can be suppressed.

The concentration device may include a frame body configured to hold the filter, in which the frame body may include a first housing and a second housing that fits to the first housing, and the filter may be sandwiched and held between the first housing and the second housing.

With this configuration, occurrence of bending and/or wrinkles of the filter can be suppressed.

In the concentration device, an inner wall of the first housing may be provided with a first screw portion, an outer wall of the second housing may be provided with a second screw portion screwed onto the first screw portion, and the filter may be sandwiched and held between the first housing and the second housing, by the first screw portion and the second screw portion being fastened to each other.

With this configuration, a burden on the filter can be reduced, and the filter can be easily replaced.

The concentration device may include an attachment member attached to the position control portion, in which the seal portion may be a gasket that sandwiches and holds an outer peripheral portion of the filter and an outer peripheral portion of the attachment member.

With this configuration, the sealing property between the filter and the inner wall of the container can be improved while reducing constituent elements of the device.

The concentration device may include a frame body configured to hold the filter, in which the filter may contain at least one of a metal and a metal oxide as a main component, and the frame body may include a magnet that holds the filter by magnetic force.

With this configuration, the filter can be easily replaced.

The concentration device may include a frame body configured to hold the filter, and an adhesive that fixes the filter to the frame body.

With this configuration, the filter can be rigidly fixed to the frame body while reducing constituent elements of the device.

In the concentration device, in a state where the liquid is stored in the container, a gas layer may be provided under the filter.

With this configuration, leakage of the target object from between the filter and the inner wall of the container can be suppressed.

In the concentration device, the position control portion may move the filter up and down and/or rotate the filter.

With this configuration, the target object sticking to the filter can be peeled off, and the recovery rate of the target object can be improved.

The concentration device may include a stirrer attached to the position control portion.

With this configuration, clogging of the filter can be reduced, and the recovery rate of the target object can be improved.

In the concentration device, the position control portion may include an actuator, a shaft connecting the actuator and the filter, and a cover covering a portion of the shaft that is exposed from the container.

With this configuration, an aseptic closed system can be configured.

The concentration device may include one or more discharge flow paths extending through a side wall of the container and configured to communicate an inside and an outside of the container, in which, through the one or more discharge flow paths, the liquid in the inside of the container may be discharged to the outside of the container.

With this configuration, the liquid can be discharged from the inside of the container with ease.

The concentration device may include one or more supply flow paths extending through the side wall of the container, and configured to communicate with the inside of the container on a lower side than any of the one or more discharge flow paths, in which, through the one or more supply flow paths, the liquid containing the target object may be supplied to the inside of the container.

With this configuration, the liquid can be supplied to the inside of the container with ease.

The concentration device may include: a supply tank connected to the supply flow path; and a washing liquid flow path connected to the supply tank and configured to supply a washing liquid to the supply tank.

With this configuration, a residual liquid in the supply tank and the supply flow path can be reduced.

In the concentration device, the washing liquid flow path may be connected to a side wall of the container.

With this configuration, the target object sticking to the inner wall of the container and the like can be peeled off, and the recovery rate can be improved.

The concentration device may include a recovery flow path provided at a lower portion of the container and configured to communicate with the inside of the container, in which, through the recovery flow path, the liquid containing the target object in the inside of the container may be recovered.

With this configuration, the liquid containing the target object in the container can be recovered with ease.

In the concentration device, the recovery flow path may be provided at a bottom portion of the container, and the bottom portion of the container may be provided with an inclined portion inclined toward the recovery flow path.

With this configuration, the recovery rate can be improved.

The concentration device may include a scale configured to indicate an amount of the liquid inside of the container.

With this configuration, the amount of liquid in the container can be known with ease.

A concentration system according to an aspect of the present invention includes: two or more concentration devices among the concentration devices according to the aspects of the present invention; and one or more connection flow paths connecting the two or more concentration devices.

With this configuration, the target object can be fractionated and recovered while reducing a burden on the target object.

A concentration method according to an aspect of the present invention is a concentration method for concentrating a liquid containing a target object, the concentration method including: introducing the liquid containing the target object into a container; moving a filter in the liquid containing the target object; discharging the liquid in the container located on an upper side of the container relative to the filter; and recovering the target object and the liquid remaining in the container after the discharging.

With this configuration, a burden on the target object can be reduced.

The concentration method may include the step of forming a gas layer on a lower side of the filter in the liquid.

With this configuration, leakage of the target object from between the filter and the inner wall of the container can be suppressed.

Hereinafter, Embodiment 1 according to the present invention will be described with reference to the accompanying drawings. In addition, in the drawings, elements are exaggeratedly illustrated in order to facilitate understanding of the description.

Embodiment 1

First, before describing the present invention, the concept of the present invention will be described.

FIG. 1 is a schematic cross-sectional view illustrating a concept of a concentration device 1 of Embodiment 1 according to the present invention. The X, Y, and Z directions in the diagram indicate the longitudinal direction, the lateral direction, and the height direction of the concentration device 1, respectively. As illustrated in FIG. 1, the concentration device 1 includes a container 10 and a filter 20.

In the container 10, a liquid 3 containing target objects 2 is stored. The filter 20 is disposed in the liquid 3 of the container 10. In the concentration device 1, by moving the filter 20 downward in the liquid 3, the liquid containing the target objects 2 is concentrated.

This makes it possible to concentrate the liquid without directly applying force thereto by a pump or the like. Furthermore, when the filter 20 is moved downward, the liquid 3 moves upward from a through-hole provided in the filter 20, and thus the force applied to the target object 2 is reduced. That is, the burden on the target object can be reduced.

Furthermore, since it is possible to concentrate without using a pressurizing mechanism or a suction pressure mechanism, such as a pump, miniaturization can be achieved. Furthermore, by controlling the position of the filter 20, the concentration ratio can be adjusted with ease.

Note that in the present specification, a "target object" means a target object contained in a liquid to be concentrated. For example, the target object may be a biologically derived substance contained in the liquid. The "biologically derived substance" means a substance derived from a living organism, such as a cell (eukaryote), bacteria (eubacteria), virus, and the like. Examples of the cell (eukaryote) include an induced pluripotent stem cell (iPS cell), an ES cell, a stem cell, a mesenchymal stem cell, a mononuclear cell, a single cell, a cell mass, a floating cell, an adherent cell, a nerve cell, a leukocyte, a cell for regenerative medicine, an autologous cell, a cancer cell, a circulating tumor cell (CTC) in blood, HL-60, HELA, and fungi. Examples of the bacteria (eubacteria) include *Escherichia coli* and *Mycobacterium tuberculosis*. Examples of the "liquid" include an electrolyte solution, a cell suspension, a cell culture medium, or the like.

Next, an example of a concentration device of Embodiment 1 according to the present invention will be described.

[Overall Configuration]

Figure 2:
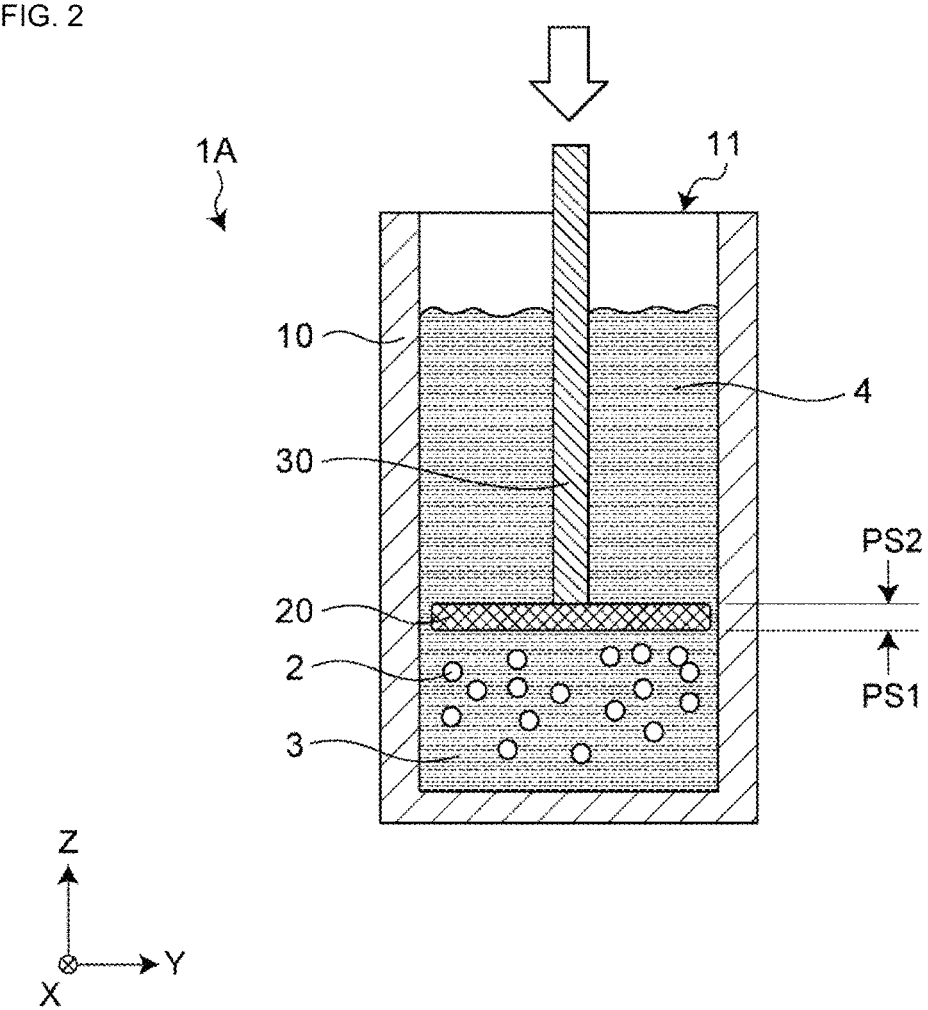
FIG. 2 is a schematic cross-sectional view of an example of a concentration device of Embodiment 1 according to the present invention.

FIG. 2 is a schematic cross-sectional view of an example of a concentration device 1A of Embodiment 1 according to the present invention. As illustrated in FIG. 2, the concentration device 1A includes the container 10, the filter 20, and a position control portion 30.

<Container>

The container 10 is a container for storing the liquid 3 containing the target objects 2. In Embodiment 1, the container 10 has a bottomed cylindrical shape. Specifically, the container 10 has a disk-like bottom portion and a side wall provided so as to protrude upward from an outer periphery of the bottom portion. Furthermore, the container 10 is provided with an opening 11 at an upper portion thereof. The opening 11 functions as an introduction port through which the liquid 3 containing the target objects 2 is introduced. Furthermore, the opening 11 also functions as a discharge port through which a liquid 4 is discharged. Note that the liquid 4 is a liquid that passes through the filter 20 and is located on an upper side relative to the filter 20.

In Embodiment 1, the target object 2 is a cell, and the liquid 3 is a cell suspension.

<Filter>

The filter 20 is a plate-like structural body having a first main surface PS1 by which the target object 2 contained in the liquid 3 is captured and a second main surface PS2 facing the first main surface PS1. The filter 20 is a metal filter. Specifically, the filter 20 contains at least one of a metal and a metal oxide as a main component thereof. The filter 20 has, for example, a disk shape.

The filter 20 is disposed inside the container 10. The filter 20 is disposed such that the thickness direction of the filter 20 is the same as the height direction of the container 10. In other words, the first main surface PS1 and the second main surface PS2 of the filter 20 are disposed so as to intersect with the inner wall of the container 10.

The outer diameter of the filter 20 is substantially equal to the inner diameter of the container 10. Here, the "substantially equal" means that the filter 20 may have a gap that enables movement inside the container 10. The gap has such a size that the target object 2 cannot pass therethrough. By providing the gap as described above, the friction with the container 10 when the filter 20 moves can be reduced and the force applied to the cell suspension can also be reduced, and thus the burden on the cells can be reduced.

Figure 3:
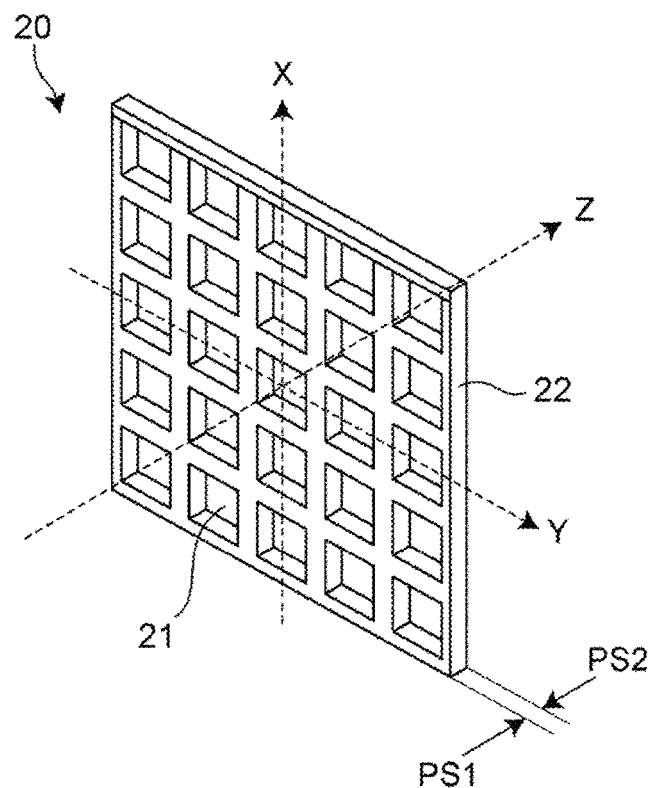
FIG. 3 is a schematic perspective view of part of an example of a filter of Embodiment 1 according to the present invention.
Figure 4:
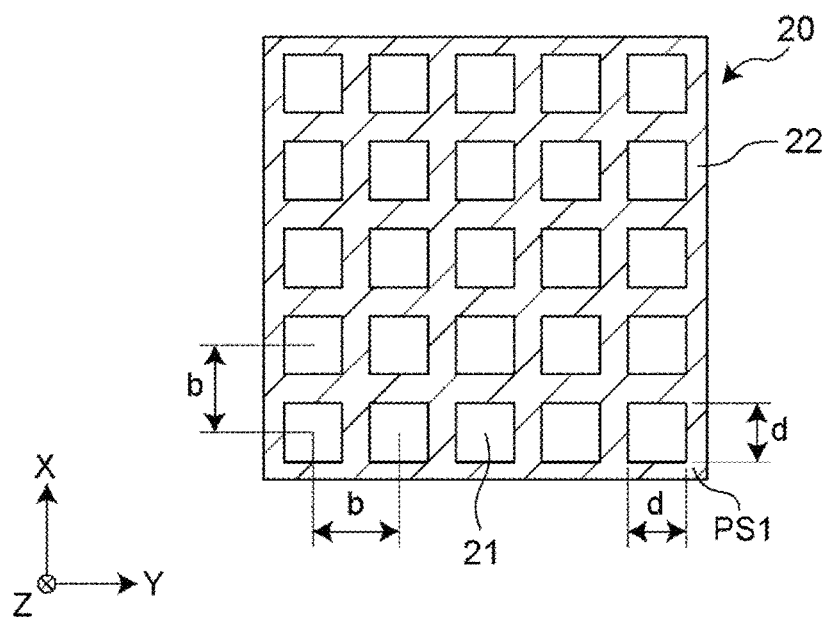
FIG. 4 is a schematic view of the part of the filter in FIG. 3 when viewed from the thickness direction.

FIG. 3 is a schematic perspective view of part of an example of the filter 20 of Embodiment 1 according to the present invention. FIG. 4 is a schematic view of the part of the filter 20 in FIG. 3 when viewed from the thickness direction. Note that FIG. 3 and FIG. 4 illustrate the part of the filter 20 in an enlarged manner. As illustrated in FIG. 3 and FIG. 4, the filter 20 includes a filter base body portion 22 having a plurality of through-holes 21.

The plurality of through-holes 21 is periodically disposed on the first main surface PS1 and the second main surface PS2 of the filter 20, in the filter base body portion 22. Specifically, the plurality of through-holes 21 is provided at equal intervals in a matrix shape in the filter base body portion 22.

In Embodiment 1, the through-hole 21 has a square shape when viewed from the first main surface PS1 side of the filter 20, that is, in the Z direction. Note that the shape of the through-hole 21 viewed from the thickness direction (Z direction) of the filter 20 is not limited to a square shape, and may be a shape such as, for example, a rectangle, a polygon, a circle, an ellipse, or the like.

In Embodiment 1, the shape (cross-sectional shape) of the through-hole 21 projected onto a surface perpendicular to the first main surface PS1 of the filter 20 is rectangular. Specifically, the length of one side of the through-hole 21 in each of the longitudinal direction (X direction) and the lateral direction (Y direction) of the filter 20 is longer than the depth of the through-hole 21 in the thickness direction (Z direction) of the filter 20. Note that the cross-sectional shape of the through-hole 21 is not limited to the rectangular shape, and may be, for example, a parallelogram, a tapered shape such as a trapezoid or the like, a symmetrical shape, or an asymmetrical shape.

In Embodiment 1, the plurality of through-holes 21 is provided at equal intervals in two arrangement directions parallel to respective sides of the square when viewed from the first main surface PS1 side (Z direction) of the filter 20, that is, in the X direction and the Y direction in FIG. 3. As described above, by providing the plurality of through-holes 21 in a square lattice arrangement, it is possible to increase an opening ratio, and it is possible to reduce a resistance to the passage of a liquid through the filter 20. With this configuration, the time for concentration can be shortened and the stress on the target object 2 can be reduced.

Note that the arrangement of the plurality of through-holes 21 is not limited to the square lattice arrangement, and may be, for example, a quasi-periodic arrangement or a periodic arrangement. Examples of the periodic arrangement may include, as long as a quadrangular arrangement, a rectangular arrangement in which the intervals in two arrangement directions are not equal to each other, or a triangular lattice arrangement, a regular triangular lattice arrangement, or the like. Note that it is sufficient that the plurality of through-holes 21 is provided in the filter base body portion 22, and the arrangement thereof is not limited.

An interval b of the plurality of through-holes 21 is appropriately designed in accordance with the type (size, form, property, elasticity) or amount of the cell that is the target object 2. Here, as illustrated in FIG. 4, the interval b between the through-holes 21 refers to a distance between the center of an arbitrary through-hole 21 and the center of the adjacent through-hole 21, when the through-hole 21 is viewed from the first main surface PS1 side of the filter 20. In the case of a structural body of the periodic arrangement, the interval b between the through-holes 21 is, for example, greater than one time and equal to or smaller than 10 times the length of one side d of the through-hole 21, and is preferably equal to or smaller than three times the length of the one side d of the through-hole 21. Alternatively, for example, the opening ratio of the filter 20 is equal to or greater than 10%, and the opening ratio is preferably equal to or greater than 25%. With this configuration, it is possible to reduce the resistance to the passage of the liquid through the filter 20. Accordingly, the treatment time can be shortened, and stress on the cells can be reduced. Note that the opening ratio is calculated by (the area occupied by the through-holes 21)/(the projected area of the first main surface PS1 when assuming that the through-holes 21 are not provided).

The outer diameter of the filter 20 is designed in accordance with the inner diameter of the container 10. In Embodiment 1, the inner diameter of the container 10 is 20.00 mm, whereas the outer diameter of the filter 20 is 19.95 mm, for example.

The thickness of the filter 20 is preferably greater than 0.1 times and equal to or smaller than 100 times the size (one side d) of the through-hole 21. More preferably, the thickness of the filter 20 is greater than 0.5 times and equal to or smaller than 10 times the size (one side d) of the through-hole 21. With this configuration, the resistance of the filter 20 to the liquid can be reduced, and the time for the concentration can be shortened. As a result, the stress on the target object 2 can be reduced.

In the filter 20, the first main surface PS1 that makes contact with the target object 2 is flat. Specifically, the surface roughness of the first main surface PS1 is preferably small. Here, the surface roughness means an average value of a difference between the maximum value and the minimum value measured by a stylus type step meter at five arbitrary points on the first main surface PS1. In Embodiment 1, the surface roughness is preferably smaller than the size of the target object 2, and is more preferably smaller than half the size of the target object 2. In other words, the openings of the plurality of through-holes 21 on the first main surface PS1 of the filter 20 are formed on the same plane (XY plane). Furthermore, the filter base body portion 22, which is a portion where the through-holes 21 are not formed, is continuously and integrally formed. With this configuration, sticking of the target object 2 to the surface (first main surface PS1) of the filter 20 is reduced, and the resistance of the liquid 3 can be reduced.

In each through-hole 21, the opening on the first main surface PS1 side and the opening on the second main surface PS2 side communicate with each other through a continuous wall surface. Specifically, the through-hole 21 is provided such that the opening on the first main surface PS1 side can be projected onto the opening on the second main surface PS2 side. That is, when the filter 20 is viewed from the first main surface PS1 side, the through-hole 21 is provided such that the opening on the first main surface PS1 side overlaps with the opening on the second main surface PS2 side. In Embodiment 1, the through-hole 21 is provided such that the inner wall thereof is perpendicular to the first main surface PS1 and the second main surface PS2.

<Position Control Portion>

The position control portion 30 controls the position of the filter 20. Specifically, the position control portion 30 moves the filter 20 disposed in the container 10 toward the bottom portion of the container 10. In Embodiment 1, the position control portion 30 is a shaft connected to the filter 20. Specifically, one end of the shaft which is the position control portion 30 is connected to the center of the filter 20 on the second main surface PS2 side. The other end of the shaft protrudes from the opening 11 of the container 10. The position control portion 30 can move the filter 20 downward by moving the shaft toward the bottom portion of the container 10.

[Operation]

Figure 5:
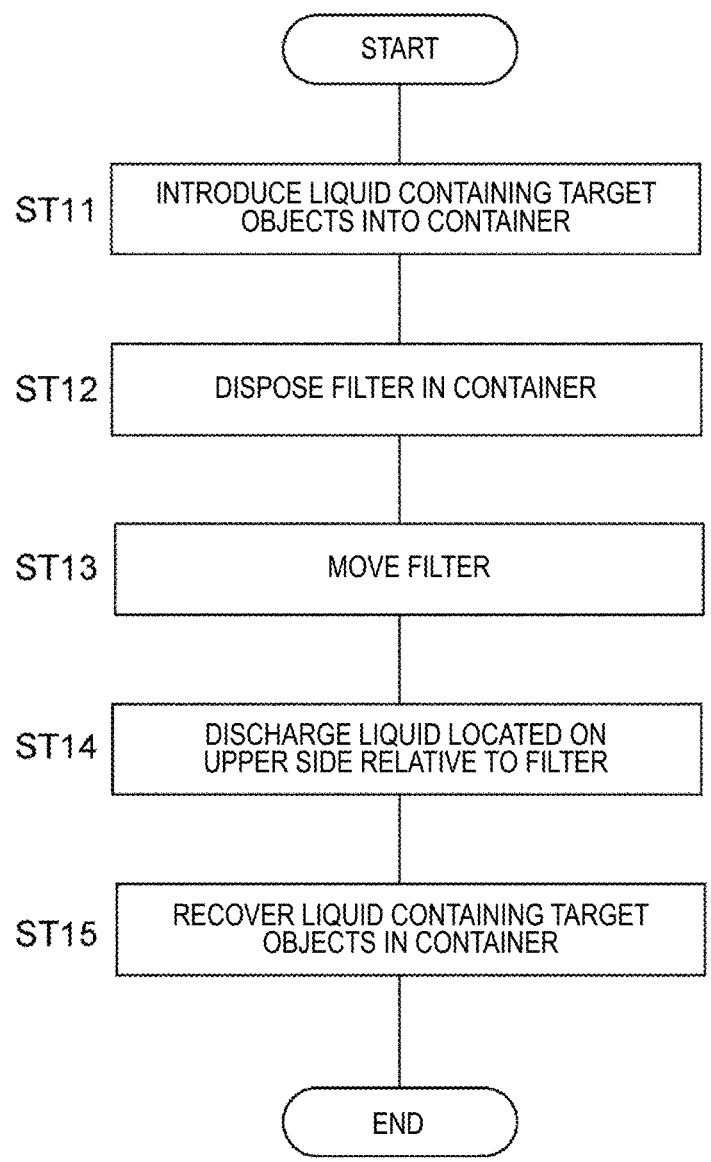
FIG. 5 is a flowchart illustrating an example of a concentration method of Embodiment 1 according to the present invention.

An example of an operation (concentration method) of the concentration device 1A will be described with reference to FIG. 5. FIG. 5 is a flowchart illustrating an example of the concentration method of Embodiment 1 according to the present invention.

As illustrated in FIG. 5, in step ST11, the liquid 3 containing the target objects 2 is introduced into the container 10. Specifically, the liquid 3 containing the target objects 2 is introduced from the opening 11 of the container 10.

In step ST12, the filter 20 is disposed in the container 10. Specifically, the filter 20 connected to the position control portion 30 is disposed in the container 10.

In step ST13, the filter 20 is moved in the container 10. Specifically, the position control portion 30 moves the filter 20 toward the bottom portion of the container 10. That is, the filter 20 moves downward in the liquid 3 in the container 10. The filter 20 moves downward in the liquid 3, whereby the target object 2 is captured on the first main surface PS1 side of the filter 20. On the other hand, the liquid 3 passes through the through-hole 21 of the filter 20. As a result, the liquid 3 containing the target objects 2 is located on the first main surface PS1 side of the filter 20, and the liquid 4 not containing the target object 2 is located on the second main surface PS2 side.

In step ST14, the liquid 4 located on the upper side relative to the filter 20 is discharged. Specifically, the liquid 4 located on the upper side relative to the second main surface PS2 of the filter 20 is discharged from the opening 11 of the container 10 by using a pipette or the like. As described above, by controlling the position of the filter 20 and discharging the liquid 4 located on the upper side relative to the second main surface PS2 of the filter 20, the liquid amount of the liquid 3 containing the target objects 2 remaining inside the container 10 can be controlled. That is, by controlling the position of the filter 20 and discharging the liquid 4 located on the upper side relative to the second main surface PS2 of the filter 20, the concentration ratio can be controlled. Furthermore, since a pipette having a smaller suction pressure than a suction pump or the like can be used, the force applied to the liquid 3 and the liquid 4 can be reduced, and the burden on the cells can be reduced.

In step ST15, the liquid 3 containing the target objects 2 in the container 10 is recovered. Specifically, the filter 20 is taken out from the inside of the container 10, and the liquid 3 containing the target objects 2 is recovered from the opening 11 by using a pipette or the like.

As described above, in Embodiment 1, by performing steps ST11 to ST15, the liquid 3 containing the target objects 2 can be concentrated.

Effects

According to the concentration device 1A according to Embodiment 1, the following effects can be obtained.

The concentration device 1A is a concentration device that concentrates the liquid 3 containing the target objects 2, and includes the container 10, the filter 20, and the position control portion 30. The container 10 stores the liquid 3 containing the target objects 2. The filter 20 is disposed in the container 10. The position control portion 30 controls the position of the filter 20. With this configuration, while reducing the burden on the target objects 2, the liquid 3 containing the target objects 2 can be concentrated. Specifically, in the concentration device 1A, without directly applying force to the liquid 3, the liquid 3 is allowed to pass through the filter 20 by the movement of the filter 20. Accordingly, the force applied to the target objects 2 is reduced. Furthermore, by performing pretreatment for encouraging passing of the liquid through the filter 20, passing of the liquid in step ST13 can be performed more quickly. Examples of the pretreatment method include a method in which the filter 20 is immersed in an ethanol solution and is made hydrophilic, and then washed with PBS.

Furthermore, the concentration device 1A can concentrate the liquid 3 containing the target objects 2 even if a pressurizing mechanism or a suction pressure mechanism, such as a pump, are not provided, and thus the device can be reduced in size.

Furthermore, by controlling the position of the filter 20, the concentration device 1A can adjust the concentration ratio of the liquid 3 containing the target objects 2 with ease.

Regardless of the driving method, it is preferable that the moving speed of the filter 20 be controlled. This is because, even if the operation is repeated, the result such as the concentration ratio can be kept at a certain level. In particular, in the case where the target object 2 relates to activity, like a biologically derived substance, in order to shorten the operation time and maintain the activity, it is preferable in some cases that the moving speed of the filter 20 be high. In this case, the moving speed of the filter 20 is preferably equal to or higher than 1 mm/min. This is because even when the amount of the liquid 3 is 2 ml which is a liquid amount handled in a 6-well plate, operation can be performed within 60 minutes in which the activity is maintained with ease. In order to make it even easier to maintain the activity, more preferably, the moving speed of the filter 20 is equal to or higher than 2 mm/min.

On the other hand, in order to prevent the pressure in the container 10 from increasing, it is preferable in some cases that the moving speed of the filter 20 be slow. In this case, the moving speed of the filter 20 is preferably equal to or lower than 1,000 mm/min. This is because the pressure in the container 10 does not rise instantaneously, and in the case where the target object 2 relates to activity, like a biologically derived substance, the influence of internal pressure rise on the activity can be eliminated. Furthermore, when the size of the through-hole 21 is equal to or smaller than 30 μm, the moving speed of the filter 20 is preferably equal to or lower than 500 mm/min. Since the pressure loss of the filter having the through-hole 21 small in size is high, the pressure rise in the container 10 may increase when the through-hole 21 has a size equal to or smaller than 30 μm. When the size of the through-hole 21 is equal to or smaller than 30 μm, if the moving speed of the filter 20 is set to be equal to or lower than 500 mm/min, an instantaneous pressure rise in the container 10 can be reduced and the activity can be more easily maintained.

Note that in Embodiment 1, the example has been described in which the liquid 3 containing the target objects 2 is concentrated, but the present invention is not limited thereto. For example, two or more kinds of target objects may be contained in the liquid 3, and may be sieved by the filter 20 in accordance with the sizes. The fractionation and concentration can be carried out by using the concentration device 1A.

In Embodiment 1, the example has been described in which the container 10 has the bottomed cylindrical shape, but the present invention is not limited thereto. It is sufficient that the shape of the container 10 is a bottomed tubular shape. For example, the container 10 may have a shape such as a polygon, an ellipse, a rhombus, or the like.

In Embodiment 1, the example has been described in which the opening 11 functions as the introduction port through which the liquid 3 containing the target objects 2 is introduced and functions as the discharge port through which the liquid 4 is discharged, but the present invention is not limited thereto. For example, the side wall of the container 10 may be provided with the introduction port and the discharge port. In this case, the opening 11 may not be provided.

In Embodiment 1, the example has been described in which the filter 20 has a disk shape, but the present invention is not limited thereto. It is sufficient that the filter 20 has a shape that enables movement inside the container 10. In addition, the shape of the filter 20 may be substantially the same as the shape of the inside of the container 10. For example, when the shape of the inside of the container 10 is a polygon, the shape of the filter 20 may also be a polygon.

In Embodiment 1, the example has been described in which the concentration device 1A includes one filter 20, but the present invention is not limited thereto. The concentration device 1A may include a plurality of filters 20. For example, the concentration device 1A may include a plurality of filters 20 disposed side by side in the height direction of the container 10. In this case, the sizes of the through-holes 21 of the plurality of filters 20 may be different from one another. For example, when the sizes of the through-holes of the plurality of filters are different and two or more kinds of target objects are contained in the liquid 3, the target objects can be sieved stepwise in accordance with the sizes. Alternatively, the plurality of filters 20 may be disposed side by side on the same plane.

In Embodiment 1, the example has been described in which the first main surface PS1 of the filter 20 is flat, but the present invention is not limited thereto. For example, the first main surface PS1 of the filter 20 may be bent, or may have a wave shape. With this configuration, the pressure of the liquid 3 can be released.

In Embodiment 1, the example has been described in which the position control portion 30 is a single shaft, but the present invention is not limited thereto. It is sufficient that the position control portion 30 has a mechanism for moving the filter 20. For example, the position control portion 30 may include a plurality of shafts. In this case, since the second main surface PS2 of the filter 20 can be supported by the plurality of shafts, bending of the filter 20 can be reduced. Alternatively, the position control portion 30 may include a tubular member. For example, the tubular member can support an end portion of the filter 20 by being connected to the outer periphery of the filter 20. This makes it possible to further reduce bending of the filter 20. Alternatively, the position control portion 30 may include a spring.

In Embodiment 1, the example has been described in which the shaft is connected to the center of the main surface of the filter 20, but the present invention is not limited thereto. The shaft may be connected directly or indirectly to the filter 20. For example, the shaft may be connected to a position shifted from the center of the main surface of the filter 20. Since the central portion of the filter 20 has the largest liquid amount passing therethrough, by shifting the connection position of the shaft from the center of the main surface of the filter 20, interference with passing of the liquid can be reduced, and the working time can be reduced as a result. In that case, it is preferable that a plurality of shafts be installed on a circumference equidistant from the center of the main surface of the filter 20 at equal intervals.

Alternatively, the mechanism for moving the filter 20 may be achieved by an actuator, a magnetic force from the outside of the container 10, pressure gas (micro pump), or the like.

In Embodiment 1, the concentration device 1A may include a position sensor for detecting the position of the filter 20, a flow rate sensor for detecting the flow rate in the container 10, and/or a pressure sensor for detecting the pressure inside the container 10. By controlling the position control portion 30 on the basis of the detection results of these sensors, it is possible to further reduce the force applied to the target object 2 and to control the concentration ratio with high accuracy.

In Embodiment 1, the example has been described in which the filter 20 moves toward the bottom portion of the container 10 in step ST13, but the present invention is not limited thereto. The filter 20 may be moved temporarily upward in the container 10. By moving the filter 20 upward in the container 10, the liquid 4 moves to the lower side of the filter 20 through the through-hole 21. At this time, the target objects sticking to the filter 20 can be released into the liquid 3. Accordingly, in the recovery in step ST15, a large number of target objects 2 can be recovered. More preferably, in the final operation in step ST13, the filter 20 is moved slightly upward in the container 10. In the recovery in step ST15, a larger number of target objects 2 can be recovered. At this time, the distance in the movement upward is preferably equal to or greater than the thickness of the filter 20 in order to improve the recovery amount, and is preferably equal to or smaller than several cm in order not to significantly reduce the discharge liquid amount. Specifically, the amount of movement when the filter 20 is slightly moved upward in the container 10 is preferably equal to or greater than 0.02 mm and equal to or smaller than 30 mm. Furthermore, the up-down movement of the filter 20 may be performed at non-uniform speed (e.g., pulsation). This makes it possible to further reduce clogging of the filter 20.

Embodiment 2

A concentration device of Embodiment 2 according to the present invention will be described.

In Embodiment 2, points different from those in Embodiment 1 will be mainly described. In Embodiment 2, the same or equivalent configurations as those in Embodiment 1 will be described with the same reference numerals. In addition, in Embodiment 2, descriptions overlapping with those in Embodiment 1 will be omitted.

Embodiment 2 is different from Embodiment 1 in that a seal portion is included.

Figure 6:
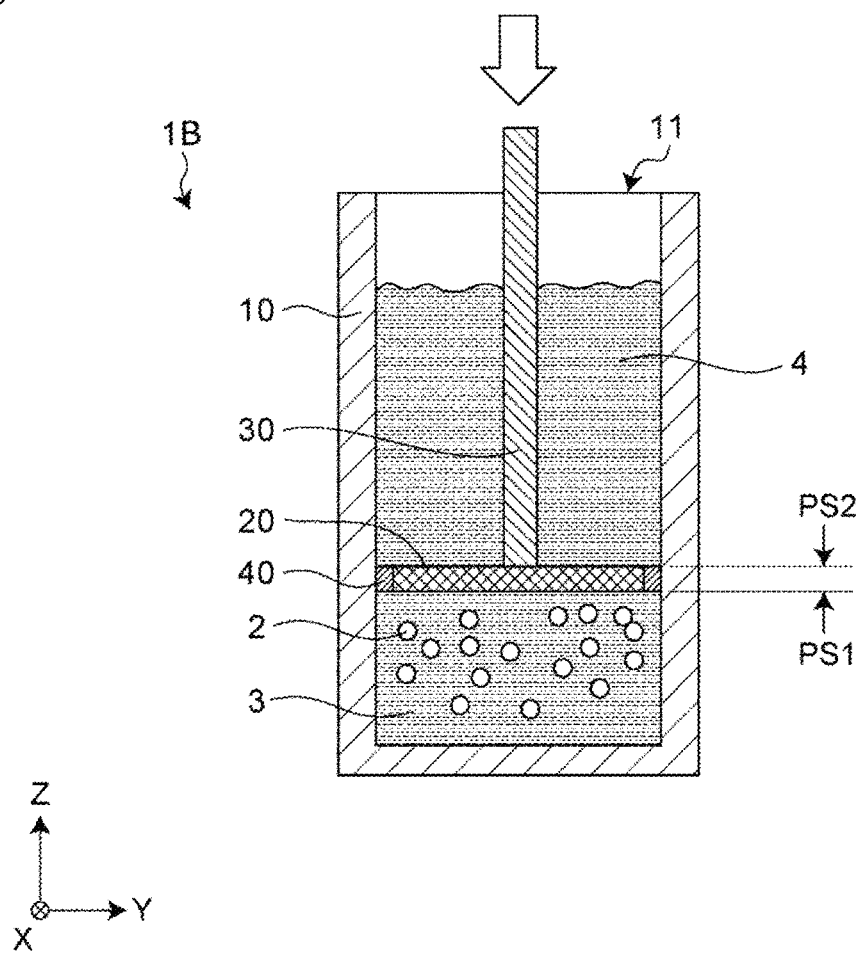
FIG. 6 is a schematic cross-sectional view illustrating an example of a configuration of a concentration device of Embodiment 2 according to the present invention.

FIG. 6 is a schematic cross-sectional view illustrating part of an example of a configuration of a concentration device 1B of Embodiment 2 according to the present invention. As illustrated in FIG. 6, the concentration device 1B includes a seal portion 40.

<Seal Portion>

The seal portion 40 seals a portion between the filter 20 and the inner wall of the container 10. Specifically, the seal portion 40 is attached to the outer peripheral portion of the filter 20. The seal portion 40 is formed of a plastic material or a hollow material. The seal portion 40 is, for example, a packing, a gasket, or the like.

With this configuration, passage of the target object 2 between the filter 20 and the inner wall of the container 10 can be suppressed. When the seal portion 40 is formed of a plastic material (for example, an elastic body such as rubber), the sealing property between the filter 20 and the inner wall of the container 10 can be enhanced, and leakage of the target object 2 can be further reduced. When the seal portion 40 is formed of a hollow material, fitting of the seal portion 40 is easily obtained even when the distance between the filter 20 and the inner wall of the container 10 changes during the movement of the filter 20. This makes it easy to move the filter 20, and makes it possible to suppress leakage of the target object 2.

Note that in Embodiment 2, the example has been described in which the concentration device 1B includes one filter 20, but the present invention is not limited thereto. For example, the concentration device 1B may include a plurality of filters 20, and the seal portion 40 may be disposed on each of the plurality of filters 20.

Figure 7:
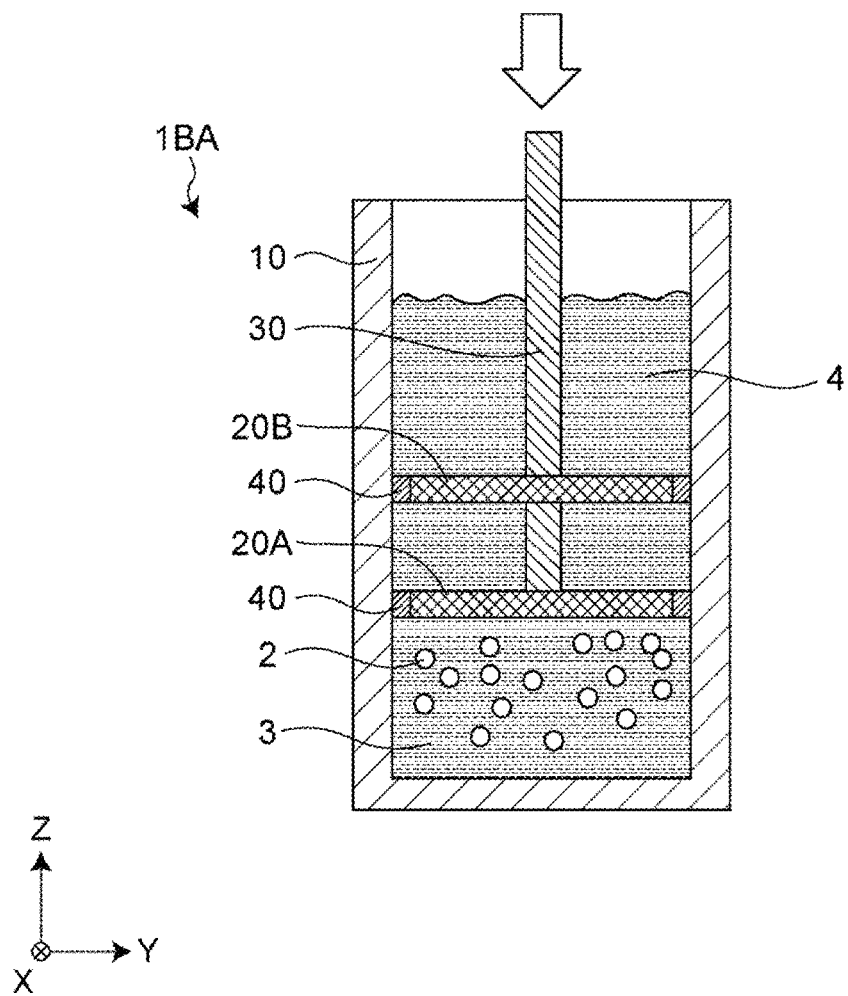
FIG. 7 is a schematic cross-sectional view illustrating a configuration of a concentration device of a modification of Embodiment 2 according to the present invention.

FIG. 7 is a schematic cross-sectional view illustrating a configuration of a concentration device 1BA of a modification of Embodiment 2 according to the present invention. As illustrated in FIG. 7, the concentration device 1BA includes a plurality of filters 20A and 20B. Furthermore, the seal portions 40 are disposed on the outer peripheries of the plurality of filters 20A and 20B, respectively. This enhances the sealing property between the plurality of filters 20A and 20B and the inner wall of the container 10, and makes it possible to stabilize the movement of the plurality of filters 20A and 20B. As a result, the leakage of the target object 2 can be further suppressed.

Note that in the concentration device 1BA, the plurality of filters 20A and 20B may have the same configuration or may have different configurations. For example, when the sizes of the through-holes of the filter 20A and the filter 20B are different and two or more kinds of target objects are included in the liquid 3, the target objects can be sieved in accordance with the sizes by the filter 20A and the filter 20B. When the size of the through-hole of the filter 20A is smaller than the size of the through-hole of the filter 20B, the target objects can be fractionated into three regions. In addition, the filter 20B may be a plate material having one or more holes through which the liquid can pass in the thickness direction.

Embodiment 3

A concentration device of Embodiment 3 according to the present invention will be described.

In Embodiment 3, points different from those in Embodiment 1 will be mainly described. In Embodiment 3, the same or equivalent configurations as those in Embodiment 1 will be described with the same reference numerals. In addition, in Embodiment 3, descriptions overlapping with those in Embodiment 1 will be omitted.

Embodiment 3 is different from Embodiment 1 in that a gas layer is formed.

Figure 8:
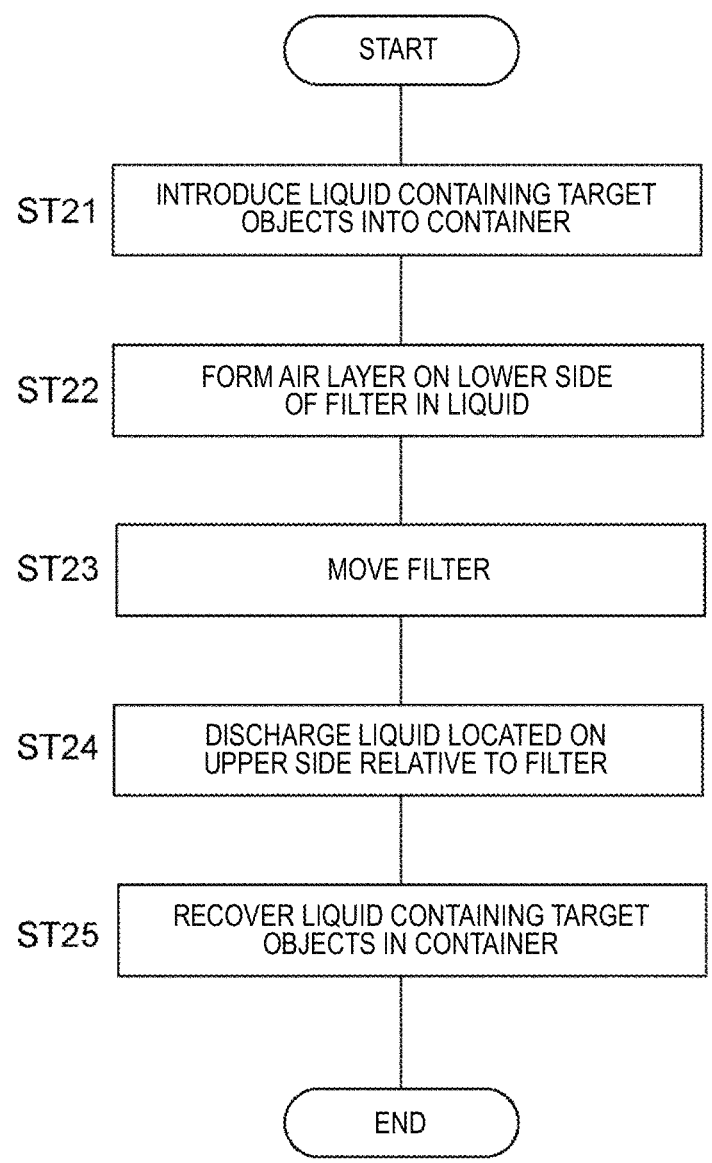
FIG. 8 is a flowchart illustrating an example of a concentration method of Embodiment 3 according to the present invention.
Figure 9:
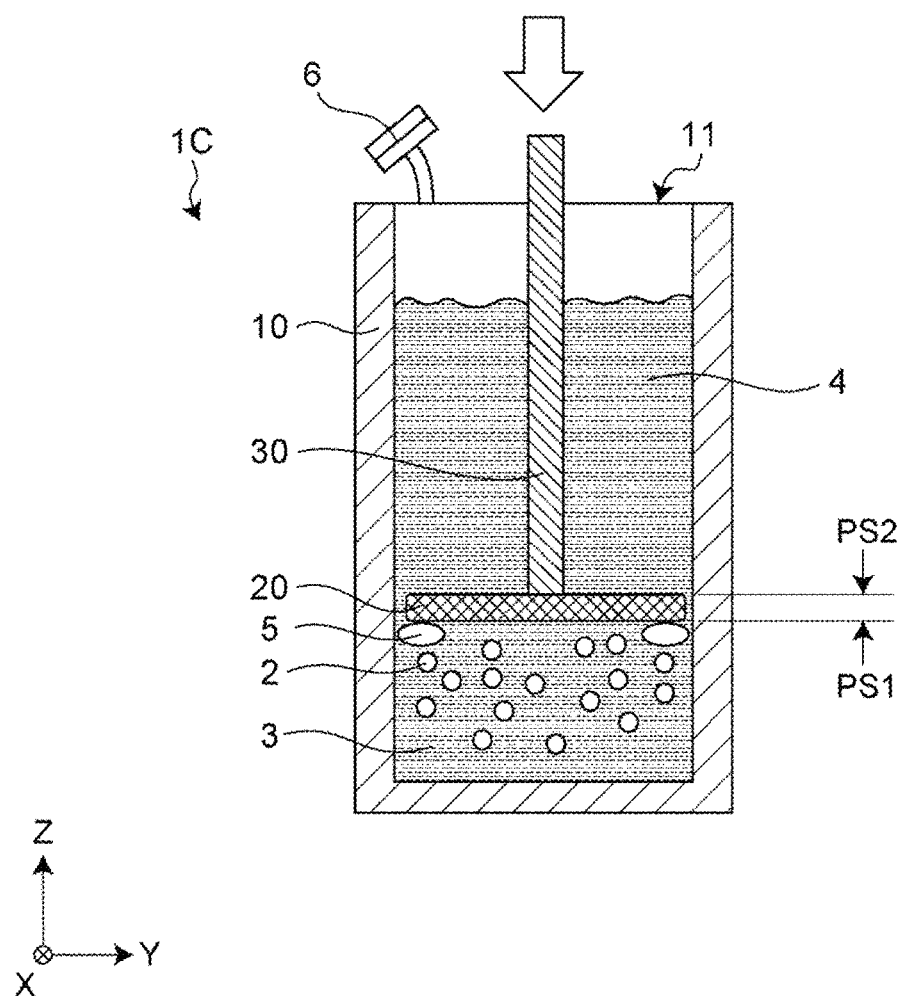
FIG. 9 is a schematic cross-sectional view illustrating an example of a step of forming a gas layer in a concentration device of Embodiment 3 according to the present invention.

FIG. 8 is a flowchart illustrating an example of a concentration method of Embodiment 3 according to the present invention. FIG. 9 is a schematic view illustrating an example of step ST22 of forming a gas layer 5 in a concentration device 1C of Embodiment 3 according to the present invention. Note that steps ST21 and ST23 to ST25 illustrated in FIG. 8 are the same as steps ST11 and ST13 to ST15 illustrated in FIG. 5, respectively, and detailed descriptions thereof will be omitted.

As illustrated in FIG. 8, in step ST21, the liquid 3 containing the target objects 2 is introduced into the container 10.

In step ST22, the gas layer 5 is formed on the lower side of the filter 20 in the liquid 3. In Embodiment 3, the gas layer 5 is formed of air.

As illustrated in FIG. 9, in the concentration device 1C, when the filter 20 is disposed inside the container 10, the filter 20 is inserted into the inside of the container 10 through the opening 11 such that air enters on the first main surface PS1 side of the filter 20. More specifically, for example, part of the second main surface PS2 of the filter 20 is covered with a liquid film, the air is held inside the through-hole 21, and then the filter is inserted into the inside of the container 10. Alternatively, a gas inflow path may be provided in a lower portion of the container 10, and gas may be introduced through the gas inflow path. Alternatively, in step ST21, the liquid 3 containing gas may be introduced into the container 10. As a result, in a state in which the filter 20 is in the liquid 3 in the container 10, the gas layer 5 is formed on the first main surface PS1 side of the filter 20.

In step ST23, the filter 20 is moved by the position control portion 30.

In step ST24, the liquid 4 located on the upper side relative to the filter 20 is discharged.

In step ST25, the liquid 3 containing the target objects 2 in the container 10 is recovered.

As described above, in Embodiment 3, by performing steps ST21 to ST25, the liquid 3 containing the target objects 2 can be concentrated.

In Embodiment 3, in step ST22, the gas layer 5 is formed on the lower side of the filter 20. By forming the gas layer 5, leakage of the target object 2 from between the filter 20 and the inner wall of the container 10 can be suppressed. Furthermore, when the end portion of the filter 20 bends toward the second main surface PS2 side due to the movement of the filter 20, the gas layer 5 moves by buoyancy to the bent portion. As described above, since the gas layer 5 moves to a position where the distance between the filter 20 and the inner wall of the container 10 is likely to become large, the leakage of the target objects 2 from between the filter 20 and the inner wall of the container 10 can be reduced. In Embodiment 3, when the seal portion 40 is not provided, the friction with the container 10 when the filter 20 moves can be reduced and the force applied to the cell suspension can also be reduced, and thus the burden on the cells can be reduced.

Note that in Embodiment 3, the example has been described in which the gas layer 5 is formed of air, but the present invention is not limited thereto. For example, the gas layer 5 may include carbon dioxide. When the gas layer 5 contains carbon dioxide, the activity of the cells that are the target objects 2 can be maintained for a long period of time.

In addition, the air that forms the gas layer 5 may be sterilized. Alternatively, when the container 10 is configured by a closed system, the air that forms the gas layer 5 may be air that has passed through a filter 6 that does not allow bacteria to pass therethrough. This makes it possible to perform a sterilization operation.

Embodiment 4

A concentration device of Embodiment 4 according to the present invention will be described.

In Embodiment 4, points different from those in Embodiment 1 will be mainly described. In Embodiment 4, the same or equivalent configurations as those in Embodiment 1 will be described with the same reference numerals. In addition, in Embodiment 4, descriptions overlapping with those in Embodiment 1 will be omitted.

Embodiment 4 is different from Embodiment 1 in that the filter is moved up and down and rotated.

Figure 10:
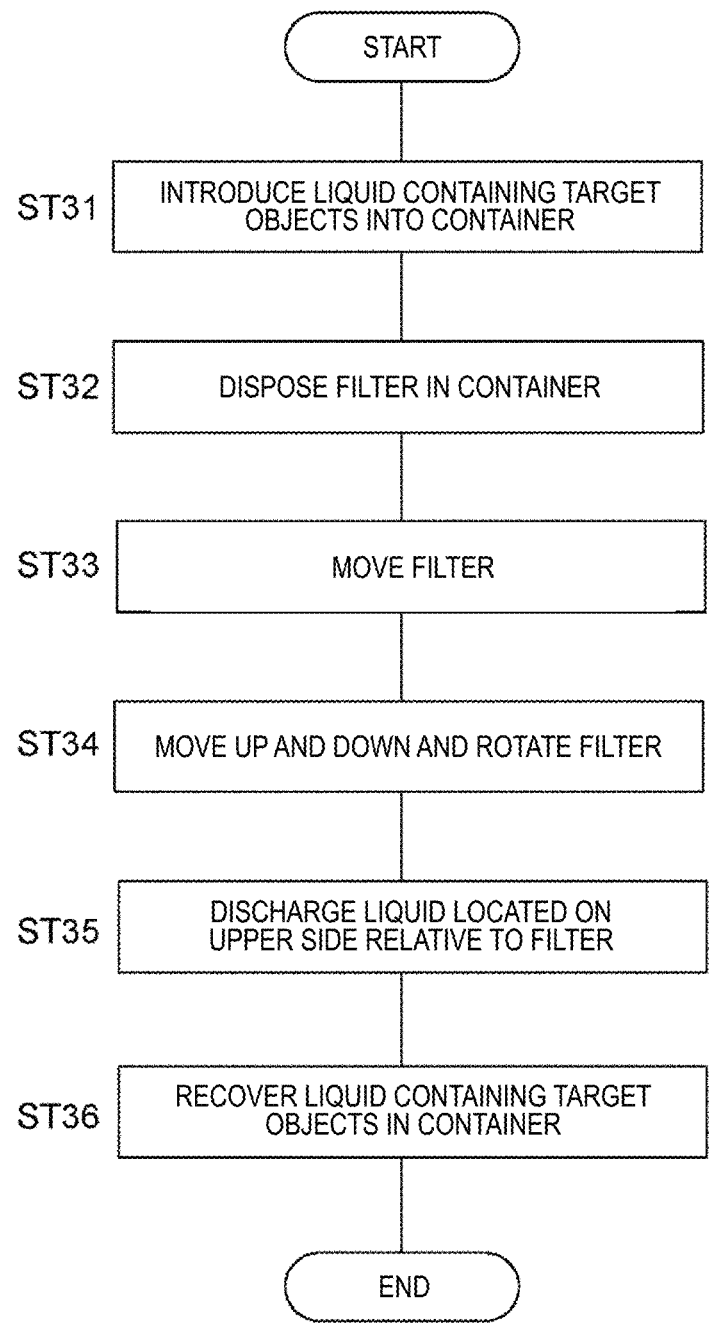
FIG. 10 is a flowchart illustrating an example of a concentration method of Embodiment 4 according to the present invention.
Figure 11:
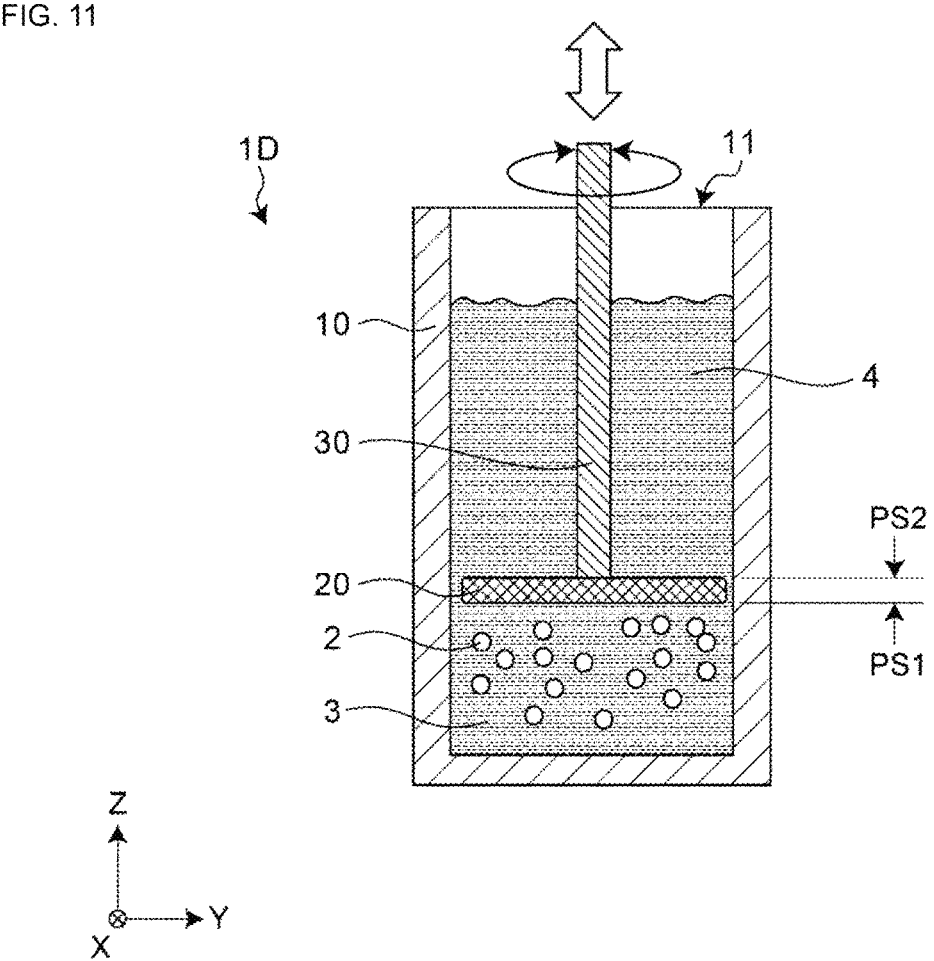
FIG. 11 is a schematic view illustrating an example of a step of moving up and down and/or rotating a filter in a concentration device of Embodiment 4 according to the present invention.

FIG. 10 is a flowchart illustrating an example of a concentration method of Embodiment 4 according to the present invention. FIG. 11 is a schematic view illustrating an example of step ST34 of moving up and down and/or rotating the filter 20 in a concentration device 1D of Embodiment 4 according to the present invention. Note that steps ST31 to ST33, ST35, and ST36 illustrated in FIG. 10 are the same as steps ST11 to ST15 illustrated in FIG. 5, respectively, and detailed descriptions thereof will be omitted.

As illustrated in FIG. 10, in step ST31, the liquid 3 containing the target objects 2 is introduced into the container 10.

In step ST32, the filter 20 is disposed inside the container 10.

In step ST33, the filter 20 is moved by the position control portion 30.

In step ST34, the filter 20 is moved up and down and rotated by the position control portion 30.

As illustrated in FIG. 11, the position control portion 30 moves the filter 20 in the up-down direction by moving the shaft in the up-down direction. For example, the position control portion 30 vibrates the filter 20 in the up-down direction (Z direction). The movement of the shaft in the up-down direction can be achieved by, for example, an actuator such as a cylinder, a piston, or the like.

Furthermore, the position control portion 30 rotates the filter 20 attached to one end of the shaft by rotating around the axial direction (Z direction) of the shaft as the center. With this, the target objects 2 sticking to the first main surface PS1 of the filter 20 are peeled off. The rotation of the shaft can be achieved by, for example, an actuator, such as a motor, attached to the other end of the shaft.

In step ST35, the liquid 4 located on the upper side relative to the filter 20 is discharged.

In step ST36, the liquid 3 containing the target objects 2 in the container 10 is recovered.

As described above, in Embodiment 4, by performing steps ST31 to ST36, the liquid 3 containing the target objects 2 can be concentrated.

In Embodiment 4, in step ST34, the filter 20 is moved up and down and rotated. As a result, clogging of the filter 20 can be reduced, and the recovery rate of the target object 2 can be improved.

Note that in Embodiment 4, the example has been described in which the filter 20 is moved up and down and rotated in step ST34, but the present invention is not limited thereto. In step ST34, it is sufficient that at least one of the up-down movement and the rotation of the filter 20 is performed.

Furthermore, the up-down movement and rotation of the filter 20 may be performed at non-uniform speed (e.g., pulsation). This makes it possible to further reduce clogging of the filter 20.

Furthermore, the up-down movement and rotation of the filter 20 may be achieved by, for example, vibration by ultrasonic waves or a rotation mechanism such as a rotary cam or the like.

Embodiment 5

A concentration device of Embodiment 5 according to the present invention will be described.

In Embodiment 5, points different from those in Embodiment 1 will be mainly described. In Embodiment 5, the same or equivalent configurations as those in Embodiment 1 will be described with the same reference numerals. In addition, in Embodiment 5, descriptions overlapping with those in Embodiment 1 will be omitted.

Embodiment 5 is different from Embodiment 4 in that a stirrer is included.

Figure 12:
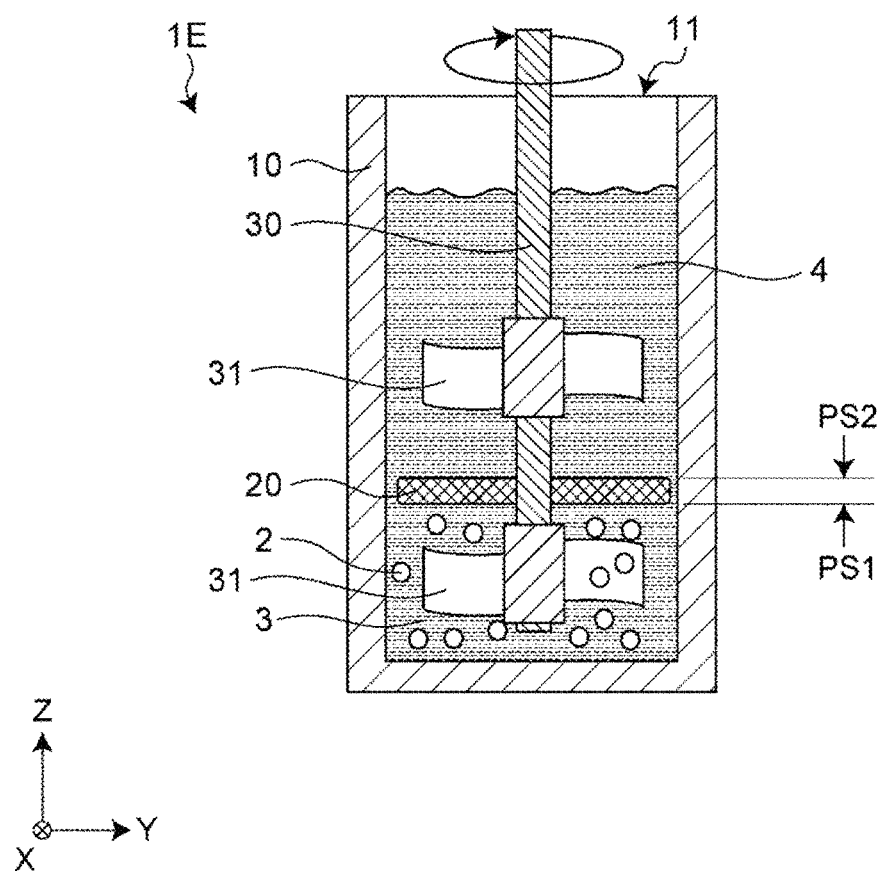
FIG. 12 is a schematic view illustrating an example of a configuration of a concentration device of Embodiment 5 according to the present invention.

FIG. 12 is a schematic cross-sectional view illustrating an example of a configuration of a concentration device 1E of Embodiment 5 according to the present invention. As illustrated in FIG. 12, the concentration device 1E includes a stirrer 31 attached to the position control portion 30. In Embodiment 5, the concentration device 1E includes two stirrers 31. Specifically, the concentration device 1E includes the stirrer 31 on each of the first main surface PS1 side and the second main surface PS2 side of the filter 20.

<Stirrer>

The stirrer 31 is attached to the position control portion 30, and specifically, is attached to a rotatable shaft of the position control portion 30. The stirrer 31 has a plurality of fins. The shaft of the position control portion 30 rotates, whereby the plurality of fins of the stirrers 31 rotates. The plurality of fins of the stirrers 31 rotates, whereby the liquids 3 and 4 inside the container 10 are stirred. As a result, clogging of the filter 20 can be reduced, and the recovery rate of the target object 2 can be improved.

Note that in Embodiment 5, the example has been described in which the concentration device 1E includes the plurality of stirrers, but the present invention is not limited thereto. It is sufficient that the concentration device 1E includes one or more stirrers.

Embodiment 6

A concentration device of Embodiment 6 according to the present invention will be described.

In Embodiment 6, points different from those in Embodiment 1 will be mainly described. In Embodiment 6, the same or equivalent configurations as those in Embodiment 1 will be described with the same reference numerals. In addition, in Embodiment 6, descriptions overlapping with those in Embodiment 1 will be omitted.

Embodiment 6 is different from Embodiment 1 in that a frame body that holds the filter is included.

Figure 13:
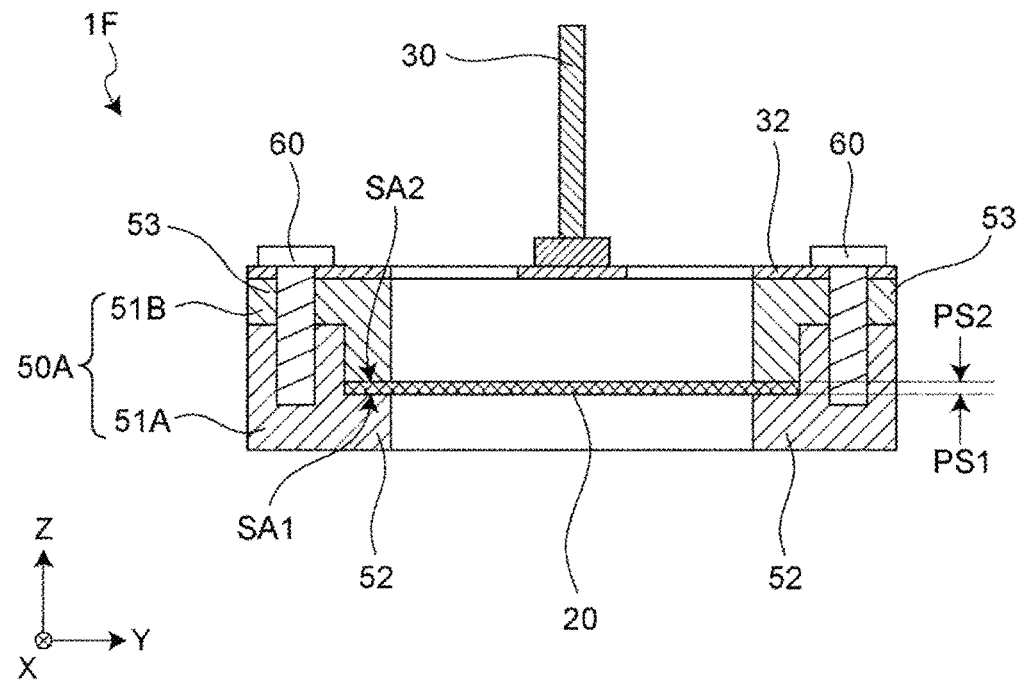
FIG. 13 is a schematic cross-sectional view illustrating part of an example of a configuration of a concentration device of Embodiment 6 according to the present invention.
Figure 14:
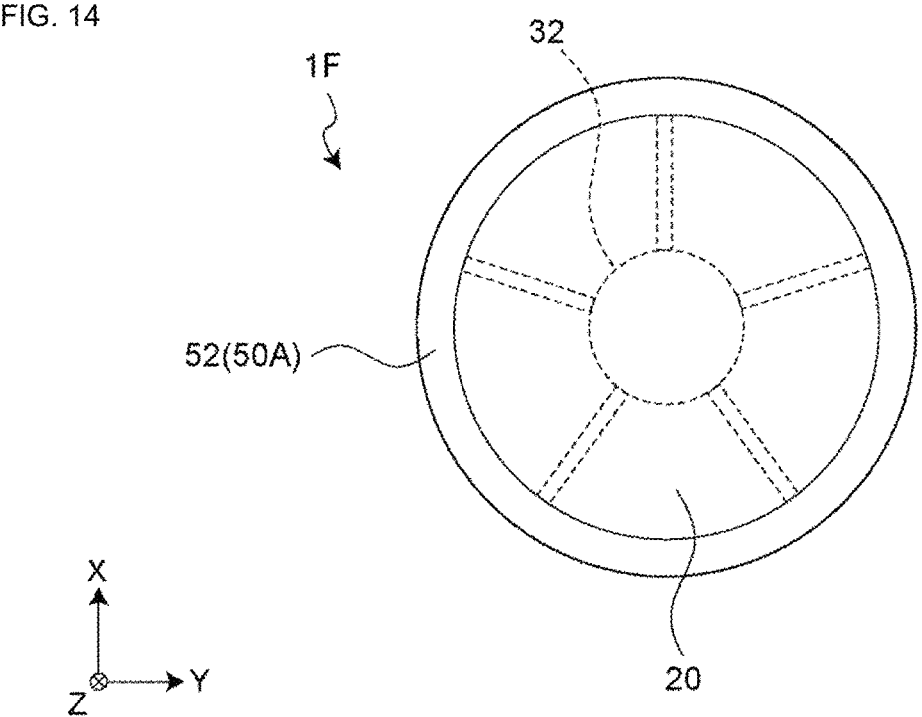
FIG. 14 is a schematic view, when viewed from below, of the part of the example of the configuration of the concentration device of Embodiment 6 according to the present invention.

FIG. 13 is a schematic cross-sectional view illustrating part of an example of a configuration of a concentration device 1F of Embodiment 6 according to the present invention. FIG. 14 is a schematic view, when viewed from below, of the part of the example of the configuration of the concentration device 1F of Embodiment 6 according to the present invention. Note that in FIG. 13 and FIG. 14, the configurations are the same as those illustrated in FIG. 2 except for a configuration in which the filter 20 is held by a frame body 50A, and therefore, illustration thereof is omitted.

As illustrated in FIG. 13 and FIG. 14, the concentration device 1F includes the frame body 50A that holds the filter 20.

<Frame Body>

The frame body 50A has a cylindrical shape, and holds the filter 20 in the inside thereof. The frame body 50A includes a first housing 51A and a second housing 51B that fits to the first housing 51A.

The first housing 51A has a cylindrical shape. On the inner wall of the first housing 51A, a first protruding portion 52 that is provided so as to protrude toward the inner side of the first housing 51A in the radial direction is provided. As illustrated in FIG. 14, when the frame body 50A is viewed from below, the first protruding portion 52 is formed in an annular shape. Accordingly, the first housing MA has an L shape in a cross-section taken along the YZ plane.

In the first protruding portion 52, on a side to be fitted to the second housing 51B, a placement surface SA1 on which the filter 20 is placed is formed. The placement surface SA1 is formed to be flat. The end portion of the filter 20 is placed on the placement surface SA1.

The second housing 51B has a cylindrical shape. On the outer wall of the second housing 51B, a second protruding portion 53 that is provided so as to protrude toward the outer side portion of the second housing 51B in the radial direction is provided. When the frame body 50A is viewed from above, the second protruding portion 53 is formed in an annular shape. Accordingly, the second housing 51B has an inverted L shape in a cross-section taken along the YZ plane.

The second housing 51B is disposed on the inner side of the first housing 51A. A lower surface SA2 of the second housing 51B makes contact with the first protruding portion 52 of the first housing 51A with the filter 20 interposed therebetween. Accordingly, the filter 20 is sandwiched between the placement surface SA1 of the first housing 51A and the lower surface SA2 of the second housing 51B. As a result, the filter 20 is held by the frame body 50A. Furthermore, the first housing 51A and the second housing 51B are fastened by, for example, screws.

The first housing 51A and the second housing 51B are formed of, for example, a resin member.

In Embodiment 6, the position control portion 30 is attached to the frame body 50A with an attachment member 32 interposed therebetween. For example, the attachment member 32 includes an annular member, a screw portion disposed at the center of the annular member, and a plurality of support members for supporting the annular member and the screw portion. The attachment member 32 is fastened to the second housing 51B by screws 60. Specifically, insertion holes into each of which the screw 60 is inserted are provided in the annular member of the attachment member 32. The screws 60 fasten the first housing 51A and the second housing 51B, and inserted into the insertion holes, respectively, whereby the attachment member 32 can be attached to the second housing 51B.

Furthermore, the connection between the position control portion 30 and the attachment member 32 is performed by, for example, a screw. For example, a screw portion is provided at one end of the shaft of the position control portion 30. By fastening the screw portion of one end of the shaft and the screw portion of the attachment member 32 to each other, the position control portion 30 and the attachment member 32 are connected to each other.

As described above, the concentration device 1F includes the frame body 50A that holds the filter 20. The frame body 50A includes the first housing 51A and the second housing 51B that fits to the first housing 51A. The filter 20 is sandwiched and held between the first housing 51A and the second housing 51B. With this configuration, the filter 20 can be rigidly fixed, and occurrence of bending and wrinkles of the filter 20 due to movement can be suppressed. Furthermore, the filter 20 can be easily replaced.

Note that in Embodiment 6, the example has been described in which the first housing 51A and the second housing 51B are fastened by the screws 60, but the present invention is not limited thereto. It is sufficient that the first housing 51A and the second housing 51B are fitted to each other, and an arbitrary method can be employed for a fixing method of these components.

In Embodiment 6, the example has been described in which the position control portion 30 is attached to the frame body 50A with the attachment member 32 interposed therebetween, but the present invention is not limited thereto. For example, the position control portion 30 may be directly attached to the frame body 50A.

In Embodiment 6, the example has been described in which the frame body 50A has the cylindrical shape, but the present invention is not limited thereto. The shape of the frame body 50A may be changed in accordance with the shapes of the filter 20 and the container 10.

Embodiment 7

A concentration device of Embodiment 7 according to the present invention will be described.

In Embodiment 7, points different from those in Embodiment 6 will be mainly described. In Embodiment 7, the same or equivalent configurations as those in Embodiment 6 will be described with the same reference numerals. In addition, in Embodiment 7, descriptions overlapping with those in Embodiment 6 will be omitted.

Embodiment 7 is different from Embodiment 6 in that the first housing and the second housing are each provided with a screw portion.

Figure 15:
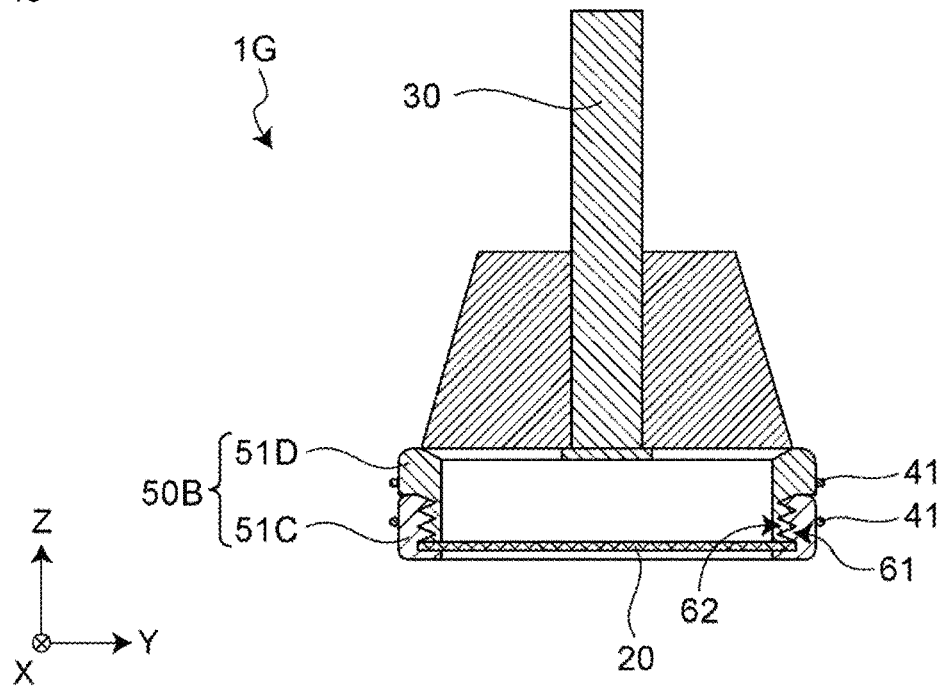
FIG. 15 is a schematic cross-sectional view illustrating part of an example of a configuration of a concentration device of Embodiment 7 according to the present invention.
Figure 16:
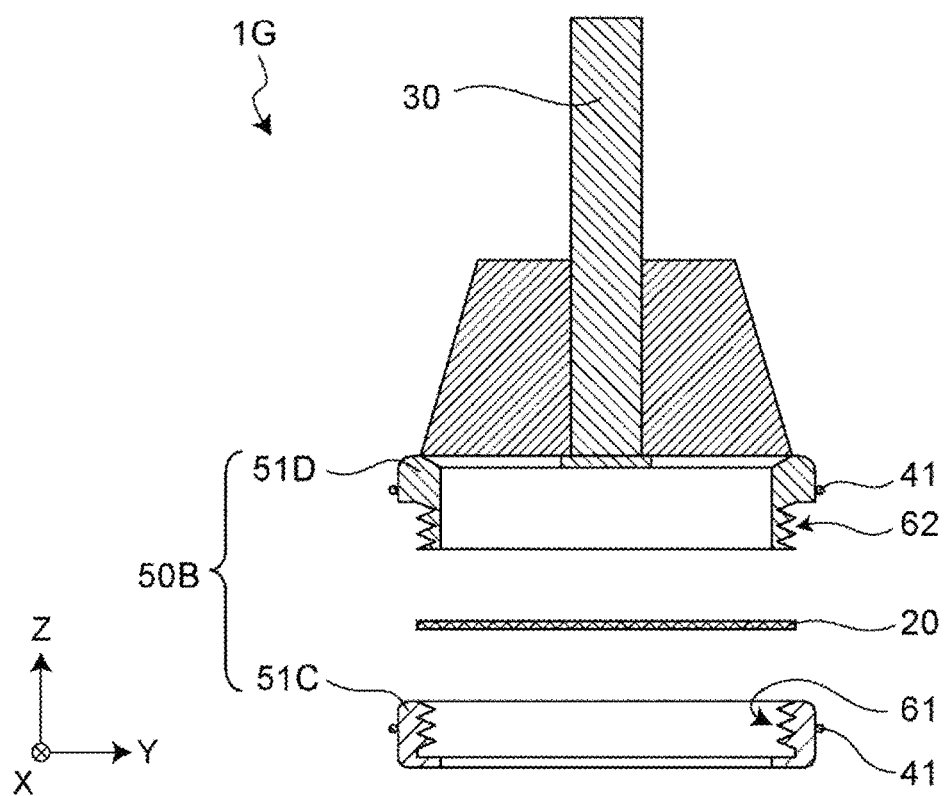
FIG. 16 is a schematic exploded cross-sectional view illustrating, in an exploded manner, the part of the example of the configuration of the concentration device of Embodiment 7 according to the present invention.

FIG. 15 is a schematic cross-sectional view illustrating part of an example of a configuration of a concentration device 1G of Embodiment 7 according to the present invention. FIG. 16 is a schematic exploded view illustrating, in an exploded manner, the part of the example of the configuration of the concentration device 1G of Embodiment 7 according to the present invention. Note that in FIG. 15 and FIG. 16, the configurations are the same as those illustrated in FIG. 2 except for a configuration in which the filter 20 is held by a frame body 50B, and therefore, illustration thereof is omitted.

As illustrated in FIG. 15 and FIG. 16, the frame body 50B includes a first housing 51C and a second housing 51D. In addition to the configuration of the first housing 51A of Embodiment 6, the first housing 51C is provided with a first screw portion 61 on the inner wall thereof. In addition to the configuration of the second housing 51B of Embodiment 6, the second housing 51D is provided with a second screw portion 62 that is screwed onto the first screw portion 61 on the outer wall thereof.

In the frame body 50B, the first screw portion 61 and the second screw portion 62 are fastened to each other, whereby the filter 20 is sandwiched and held between the first housing 51C and the second housing 51D.

In Embodiment 7, a gasket 41 is disposed as a seal portion on the outer wall of each of the first housing 51C and the second housing 51D. Furthermore, the position control portion 30 is directly connected to the second housing 51D.

In addition, in Embodiment 7, the upper surface of the second housing 51D is formed in a recessed shape. Specifically, the inner wall inside the second housing 51 has an inclined surface inclined toward the upper surface of the second housing 51D. The inclined surface is inclined toward the outer peripheral direction of the second housing 51D. With this, an opening recessed in a recessed shape is formed on the upper surface of the second housing 51D. With this configuration, the residue in the container 10 after the device is used can be reduced.

As described above, in the concentration device 1G, the inner wall of the first housing 51C is provided with the first screw portion 61. The outer wall of the second housing 51D is provided with the second screw portion 62 that is screwed onto the first screw portion 61. The first screw portion 61 and the second screw portion 62 are fastened to each other, whereby the filter 20 is sandwiched and held between the first housing 51C and the second housing 51D. With this configuration, the constituent members of the concentration device 1G is reduced, and the filter 20 can be easily replaced. Furthermore, the load on the filter 20 can be reduced. Furthermore, by providing the frame body 50B, for example, when the gasket 41 is disposed between the frame body 50B and the inner wall of the container 10, occurrence of a gap between the gasket 41 and the inner wall of the container 10 can be suppressed. Accordingly, leakage of the target object 2 from between the gasket 41 and the inner wall of the container 10 can be suppressed.

Embodiment 8

A concentration device of Embodiment 8 according to the present invention will be described.

In Embodiment 8, points different from those in Embodiment 6 will be mainly described. In Embodiment 8, the same or equivalent configurations as those in Embodiment 6 will be described with the same reference numerals. In addition, in Embodiment 8, descriptions overlapping with those in Embodiment 6 will be omitted.

Embodiment 8 is different from Embodiment 6 in that the frame body is formed of a gasket.

Figure 17:
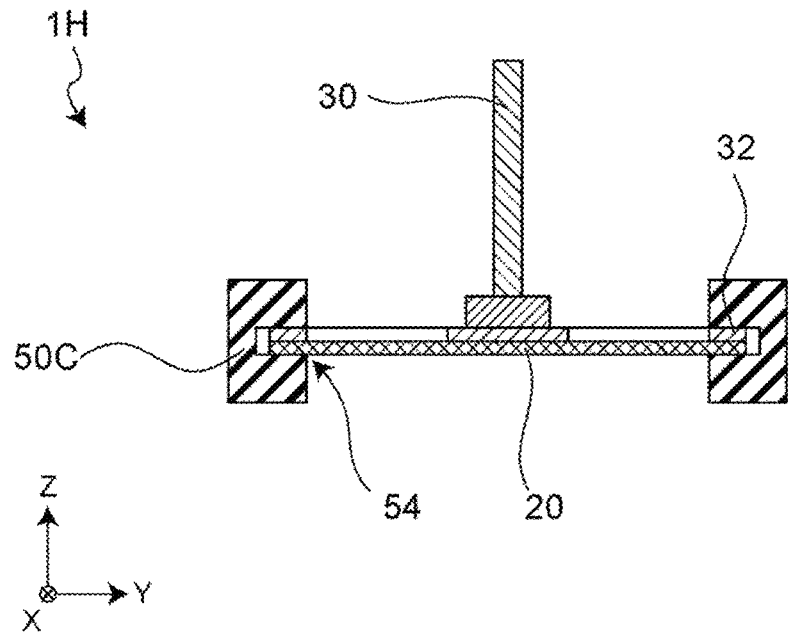
FIG. 17 is a schematic cross-sectional view illustrating part of an example of a configuration of a concentration device of Embodiment 8 according to the present invention.

FIG. 17 is a schematic cross-sectional view illustrating part of an example of a configuration of a concentration device 1H of Embodiment 8 according to the present invention. Note that in FIG. 17, the configurations are the same as those illustrated in FIG. 2 except for a configuration in which the filter 20 is held by a frame body 50C, and therefore, illustration thereof is omitted.

As illustrated in FIG. 17, the concentration device 1H includes the frame body 50C that sandwiches and holds the outer peripheral portion of the filter 20 and the outer peripheral portion of the attachment member 32.

The frame body 50C is formed of a gasket. The frame body 50C is formed in an annular shape. The inner wall of the frame body 50C is provided with a recessed portion 54. The outer peripheral portion of the filter 20 and the outer peripheral portion of the attachment member 32 are disposed in the recessed portion 54.

The frame body 50C also functions as the seal portion 40 of Embodiment 2. Accordingly, the frame body 50C seals a portion between the filter 20 and the inner wall of the container 10.

As described above, the concentration device 1H includes the frame body 50C (seal portion) that sandwiches and holds the outer peripheral portions of the attachment member 32 to which the position control portion 30 is attached and the filter 20. With this configuration, while reducing the constituent members and reducing the load on the filter 20, leakage of the target object 2 from between the filter 20 and the inner wall of the container 10 can be suppressed. Furthermore, the filter 20 can be easily replaced.

Embodiment 9

A concentration device of Embodiment 9 according to the present invention will be described.

In Embodiment 9, points different from those in Embodiment 6 will be mainly described. In Embodiment 9, the same or equivalent configurations as those in Embodiment 6 will be described with the same reference numerals. In addition, in Embodiment 9, descriptions overlapping with those in Embodiment 6 will be omitted.

Embodiment 9 is different from Embodiment 6 in that the frame body includes a magnet and holds the filter by the magnetic force of the magnet.

Figure 18:
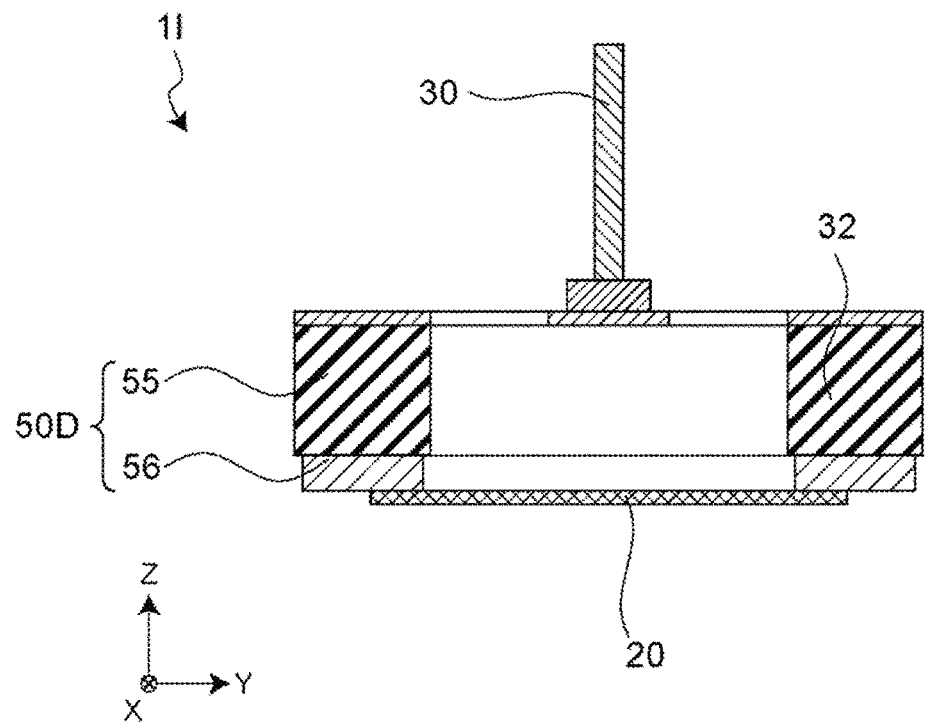
FIG. 18 is a schematic cross-sectional view illustrating part of an example of a configuration of a concentration device of Embodiment 9 according to the present invention.

FIG. 18 is a schematic cross-sectional view illustrating part of an example of a configuration of a concentration device 1I of Embodiment 9 according to the present invention. Note that in FIG. 18, the configurations are the same as those illustrated in FIG. 2 except for a configuration in which the filter 20 is held by a frame body 50D, and therefore, illustration thereof is omitted.

As illustrated in FIG. 18, in the concentration device 1I, the frame body 50D includes a resin member 55 and a magnet 56.

The resin member 55 has a cylindrical shape. The attachment member 32 is connected to the upper surface of the resin member 55. The magnet 56 is provided on the lower surface of the resin member 55.

The magnet 56 holds the filter 20 by the magnetic force. The filter 20 contains at least one of a metal and a metal oxide as a main component, and can therefore be held by the magnetic force of the magnet 56. The magnet 56 is formed in an annular shape. With this, the outer peripheral portion of the filter 20 makes contact with the magnet 56, and the outer peripheral portion of the filter 20 is held by the magnetic force.

As described above, in the concentration device 1I, the frame body 50D that holds the filter 20 includes the magnet 56 that holds the filter 20 by the magnetic force. With this configuration, while reducing the constituent members constituting the concentration device 1I, bending of the filter 20 and the like can be suppressed. Furthermore, the filter 20 can be easily replaced.

Note that in Embodiment 9, the example has been described in which the frame body 50D has the resin member 55, but the present invention is not limited thereto. The frame body 50 may not include the resin member 55. Alternatively, the frame body 50 may include another member instead of the resin member 55.

In Embodiment 9, the example has been described in which the magnet 56 is provided on the lower surface of the resin member 55, but the present invention is not limited thereto. The resin member 55 may be provided with the magnet 56 at a position where the outer peripheral portion of the filter 20 can be held by the magnetic force.

Embodiment 10

A concentration device of Embodiment 10 according to the present invention will be described.

In Embodiment 10, points different from those in Embodiment 6 will be mainly described. In Embodiment 10, the same or equivalent configurations as those in Embodiment 6 will be described with the same reference numerals. In addition, in Embodiment 10, descriptions overlapping with those in Embodiment 6 will be omitted.

Embodiment 10 is different from Embodiment 6 in that the filter is fixed to the frame body using an adhesive.

Figure 19:
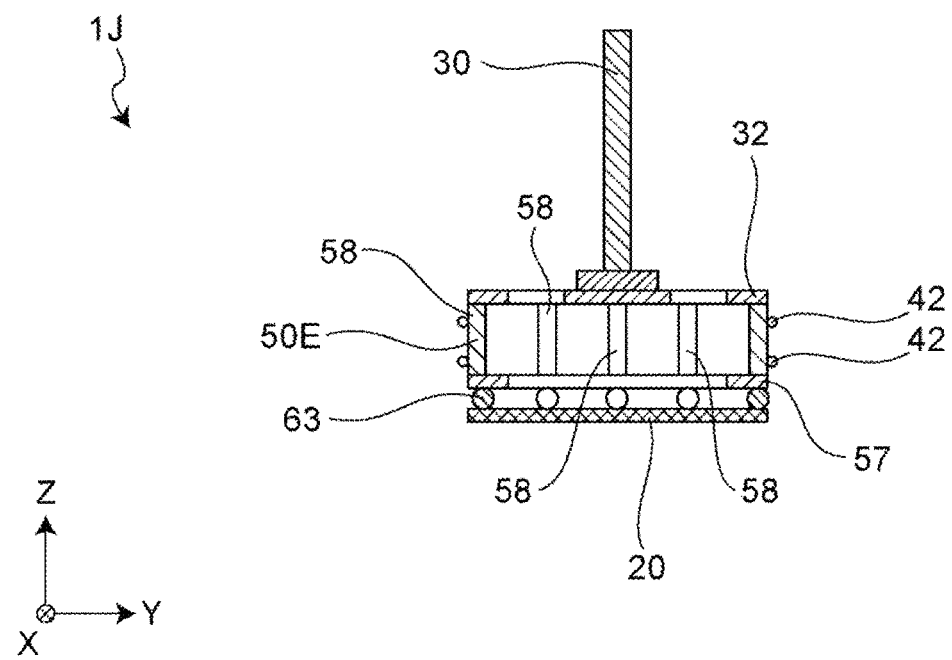
FIG. 19 is a schematic cross-sectional view illustrating part of an example of a configuration of a concentration device of Embodiment 10 according to the present invention.
Figure 20:
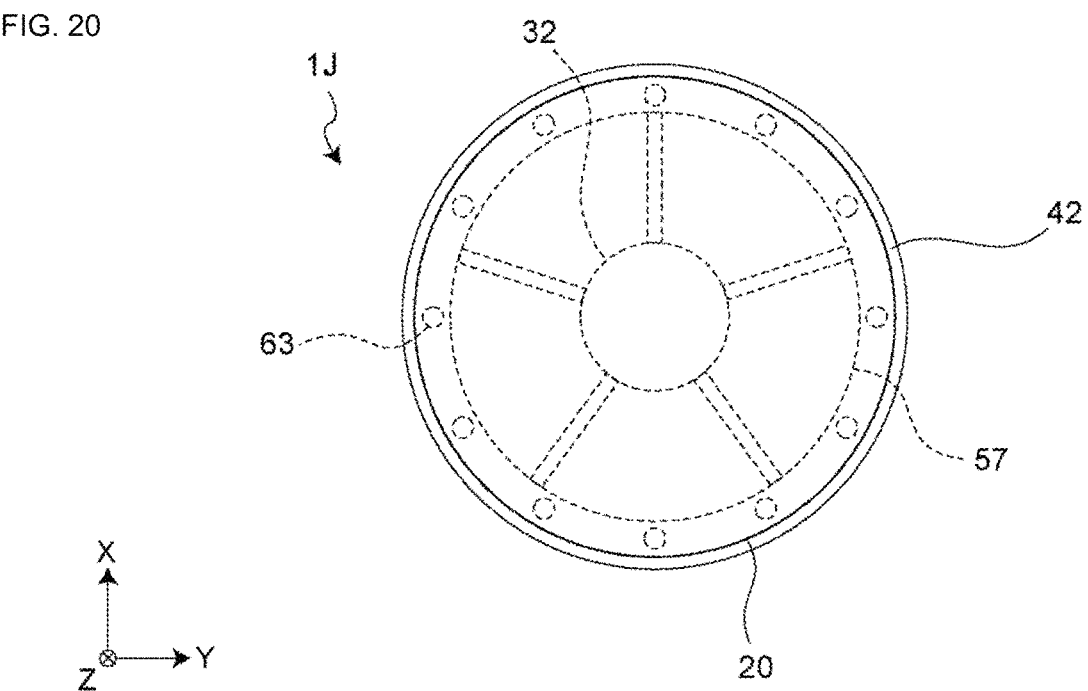
FIG. 20 is a schematic view, when viewed from below, of the part of the example of the configuration of the concentration device of Embodiment 10 according to the present invention.

FIG. 19 is a schematic cross-sectional view illustrating part of an example of a configuration of a concentration device 1J of Embodiment 10 according to the present invention. FIG. 20 is a schematic view, when viewed from below, of the part of the example of the configuration of the concentration device 1J of Embodiment 10 according to the present invention. Note that in FIG. 19 and FIG. 20, the configurations are the same as those illustrated in FIG. 2 except for a configuration in which the filter 20 is held by a frame body 50E, and therefore, illustration thereof is omitted.

As illustrated in FIG. 19, in the concentration device 1J, the frame body 50E fixes the filter 20 using adhesives 63. The frame body 50E is formed of a metal frame. Specifically, the frame body 50E has the attachment member 32, an annular member 57, and a plurality of connection members 58. In Embodiment 10, the attachment member 32, the annular member 57, and the plurality of connection members 58 are integrally formed.

The attachment member 32 forms an upper portion of the frame body 50E. To the attachment member 32, the position control portion 30 is connected. The annular member 57 forms a lower portion of the frame body 50E. The annular member 57 is disposed so as to face the attachment member 32. The plurality of connection members 58 is provided between the attachment member 32 and the annular member 57, and connects the attachment member 32 and the annular member 57 to each other. The plurality of connection members 58 is disposed with an interval therebetween.

The adhesives 63 are applied to a plurality of positions on the bottom surface of the annular member 57, and as illustrated in FIG. 20, the adhesives 63 are applied to the lower surface of the annular member 57 at intervals. The plurality of positions to which the adhesives 63 are applied functions as bonding portions that bond the annular member 57 and the outer peripheral portion of the filter 20 to each other. That is, the annular member 57 and the outer peripheral portion of the filter 20 are fixed by the plurality of bonding portions.

In Embodiment 10, two gaskets 42 are disposed as seal portions on the outer wall of the frame body 50E.

As described above, in the concentration device 1J, the filter 20 is fixed to the frame body 50E by using the adhesive 63. With this configuration, detachment of the filter 20 from the frame body 50E during movement can be suppressed. Furthermore, the number of constituent members constituting the concentration device 1J can be reduced.

Note that in Embodiment 10, the example has been described in which the attachment member 32, the annular member 57, and the plurality of connection members 58 are integrally formed in the frame body 50E, but the present invention is not limited thereto. The attachment member 32, the annular member 57, and the plurality of connection members 58 may be formed of separate members, respectively. Furthermore, the adhesive 63 may be uniformly applied without gaps. This is because the annular member 57 and the outer peripheral portion of the filter 20 can be more rigidly fixed by increasing the adhesion area of the adhesive 63.

Embodiment 11

A concentration device of Embodiment 11 according to the present invention will be described.

In Embodiment 11, points different from those in Embodiment 1 will be mainly described. In Embodiment 11, the same or equivalent configurations as those in Embodiment 1 will be described with the same reference numerals. In addition, in Embodiment 11, descriptions overlapping with those in Embodiment 1 will be omitted.

Embodiment 11 is different from Embodiment 1 in that the position control portion includes an actuator and a cover that covers the shaft.

Figure 21:
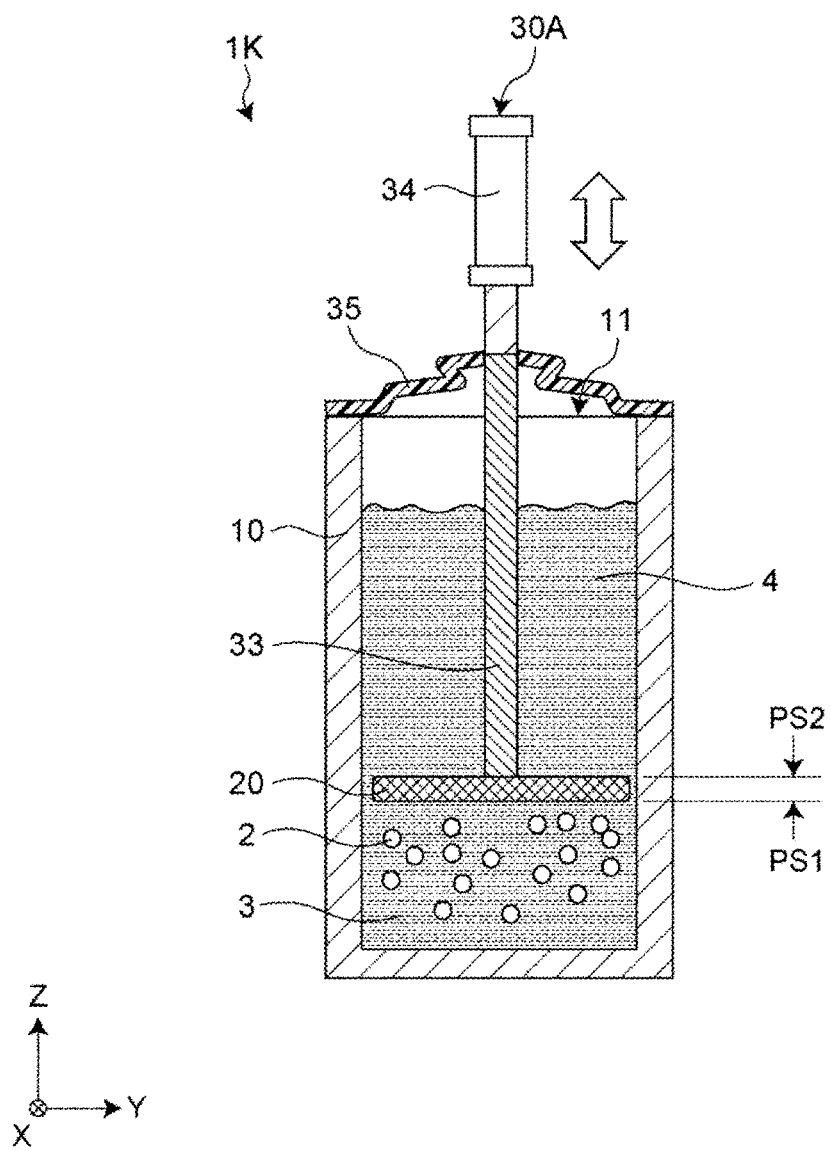
FIG. 21 is a schematic cross-sectional view illustrating an example of a configuration of a concentration device of Embodiment 11 according to the present invention.

FIG. 21 is a schematic cross-sectional view illustrating part of an example of a configuration of a concentration device 1K of Embodiment 11 according to the present invention. As illustrated in FIG. 21, in the concentration device 1K, a position control portion 30A includes, in addition to a shaft 33, an actuator 34 and a cover 35.

<Actuator>

The actuator 34 is connected to the other end of the shaft 33, and moves the shaft 33. Specifically, the actuator 34 moves the shaft 33 in the up-down direction. Since one end of the shaft 33 is connected to the filter 20, the filter 20 moves in the up-down direction by the shaft 33 moving in the up-down direction. The actuator 34 is formed of, for example, a cylinder.

<Cover>

The cover 35 covers a portion of the shaft 33 that is exposed from the container. The cover 35 is formed of a stretchable member. The cover 35 is attached above the portion where the shaft 33 is in contact with the liquid 4 when the shaft 33 is moved downward. In addition, the cover 35 is attached so as to cover the outer peripheral portion of the shaft 33. In addition, the cover 35 is attached to the upper end of the container 10. As a result, the cover 35 covers the opening 11 of the container 10, and covers the portion of the shaft 33 that protrudes upward from the opening 11. When the actuator 34 moves the shaft 33 in the up-down direction, the cover 35 stretches so as to cover the portion of the shaft 33 that is exposed from the container 10.

As described above, the concentration device 1K includes the actuator 34, the shaft 33 that connects the actuator 34 and the filter 20, and the cover 35 that covers the portion of the shaft 33 that is exposed from the container 10. With this configuration, since the shaft 33 that has made contact with the outside air does not make contact with the liquid 4, aseptic treatment can be performed.

Note that in Embodiment 11, the example has been described in which the actuator 34 is a cylinder, but the present invention is not limited thereto. It is sufficient that the actuator 34 has a mechanism capable of moving the shaft 33.

Embodiment 12

A concentration device of Embodiment 12 according to the present invention will be described.

In Embodiment 12, points different from those in Embodiment 1 will be mainly described. In Embodiment 12, the same or equivalent configurations as those in Embodiment 1 will be described with the same reference numerals. In addition, in Embodiment 12, descriptions overlapping with those in Embodiment 1 will be omitted.

Embodiment 12 is different from Embodiment 1 in that a discharge flow path and a discharge liquid tank are included.

Figure 22:
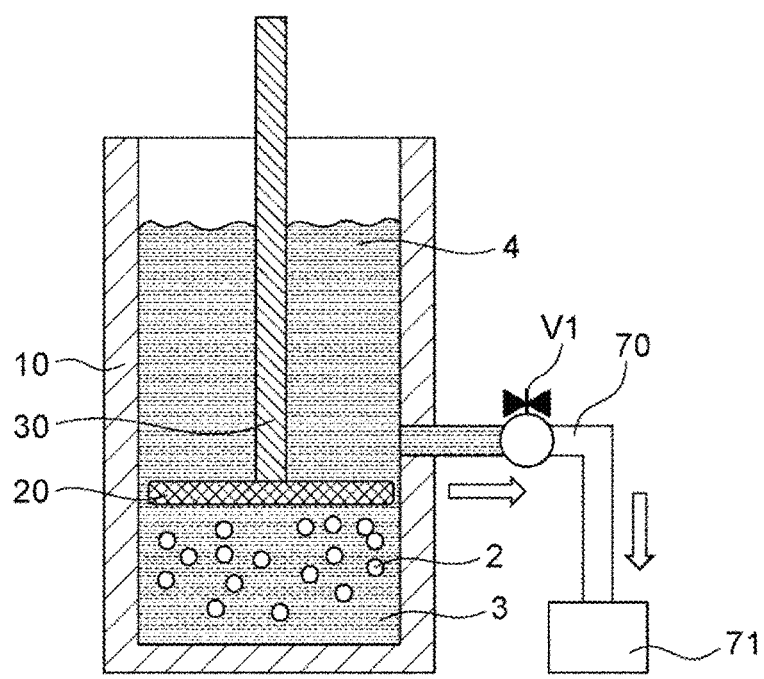
FIG. 22 is a schematic cross-sectional view illustrating an example of a configuration of a concentration device of Embodiment 12 according to the present invention.
Figure 22:
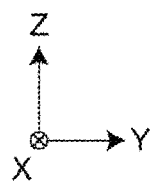

FIG. 22 is a schematic cross-sectional view illustrating part of an example of a configuration of a concentration device 1L of Embodiment 12 according to the present invention. As illustrated in FIG. 22, the concentration device 1L includes a discharge flow path 70 and a discharge liquid tank 71.

<Discharge Flow Path>

The discharge flow path 70 is a flow path that is provided at the side wall of the container 10 and communicates the inside and the outside of the container 10 with each other. Through the discharge flow path 70, the liquid 4 inside the container 10 is discharged to the outside of the container 10. In Embodiment 12, one end of the discharge flow path 70 is connected to a side wall of the container 10, and the other end of the discharge flow path 70 is connected to the discharge liquid tank 71. The connection position between the discharge flow path 70 and the side wall of the container 10 is determined in accordance with the liquid amount of the liquid 3 desired to be left inside the container 10.

It is preferable that the position of the discharge flow path 70 be located above the second main surface PS2 when the filter 20 is moved downward. This is because even if the liquid 4 is discharged to the outside of the container 10, by leaving a slight amount of liquid in the portion above the filter 20, the target object 2 can be prevented from drying. When the target object 2 is an organism-derived substance, the organism-derived substance can be prevented from deteriorating in activity due to drying.

The discharge flow path 70 is, for example, piping. In addition, a valve V1 is disposed in the discharge flow path 70. The valve V1 controls inflow of the liquid into the discharge flow path 70.

<Discharge Liquid Tank>

The discharge liquid tank 71 is connected to the other end of the discharge flow path 70, and stores the liquid 4 sent through the discharge flow path 70.

In the concentration device 1L, for example, the filter 20 is moved downward in the liquid 3, and the filter 20 is located below the connection position between the discharge flow path 70 and the container 10. Next, the valve V1 is opened, and the liquid 4 located on the upper side relative to the filter 20 is allowed to flow into the discharge flow path 70. The liquid 4 that has flowed into the discharge flow path 70 is stored in the discharge liquid tank 71.

As described above, the concentration device 1L includes the discharge flow path 70 that is provided at the side wall of the container 10 and communicates the inside and the outside of the container 10 with each other. Through the discharge flow path 70, the liquid 4 inside the container 10 is discharged to the outside of the container 10. With this configuration, the liquid 4 can be discharged from the container 10 with ease. In addition, by changing the connection position between the discharge flow path 70 and the side wall of the container 10, the amount of the liquid 4 to be discharged can be controlled. In other words, in accordance with the connection position between the discharge flow path 70 and the side wall of the container 10, the amount of liquid to be left inside the container 10 can be controlled. This makes it possible to easily control the concentration ratio.

Note that in Embodiment 12, the example has been described in which the concentration device 1L includes the valve V1 and the discharge liquid tank 71, but the present invention is not limited thereto. It is sufficient that the concentration device 1L includes the discharge flow path 70.

In Embodiment 12, the example has been described in which the liquid 4 is stored in the discharge liquid tank 71, but the present invention is not limited thereto. The liquid 4 that has flowed into the discharge flow path 70 or the liquid 4 that has been temporarily stored in the discharge liquid tank 71 may be reused instead of being discarded as it is. For example, when the liquid 3 contains an organism-derived substance, the liquid 4 may be analyzed, useful components may be extracted from the liquid 4, or the organism-derived substance contained in the liquid 4 may be proliferated again.

In Embodiment 12, it is preferable that the inner diameter of the discharge flow path 70 be smaller than the inner diameter of the container 10. This is because the outflow of the target object to the discharge flow path can be reduced. Furthermore, a filter may be disposed to the discharge flow path 70. For example, the filter may be disposed at the connection position between the discharge flow path 70 and the side wall of the container 10. This makes it possible, when the target objects 2 is contained in the liquid 4 to be discharged, to remove the target object 2 from the liquid 4 by the filter.

In Embodiment 12, the container 10 and the discharge flow path 70 may be connected to each other by an aseptic connector. This makes it possible to configure an aseptic closed system.

In Embodiment 12, the example has been described in which the concentration device 1L includes one discharge flow path 70, but the present invention is not limited thereto. The concentration device 1L may include one or more discharge flow paths 70.

Figure 23:
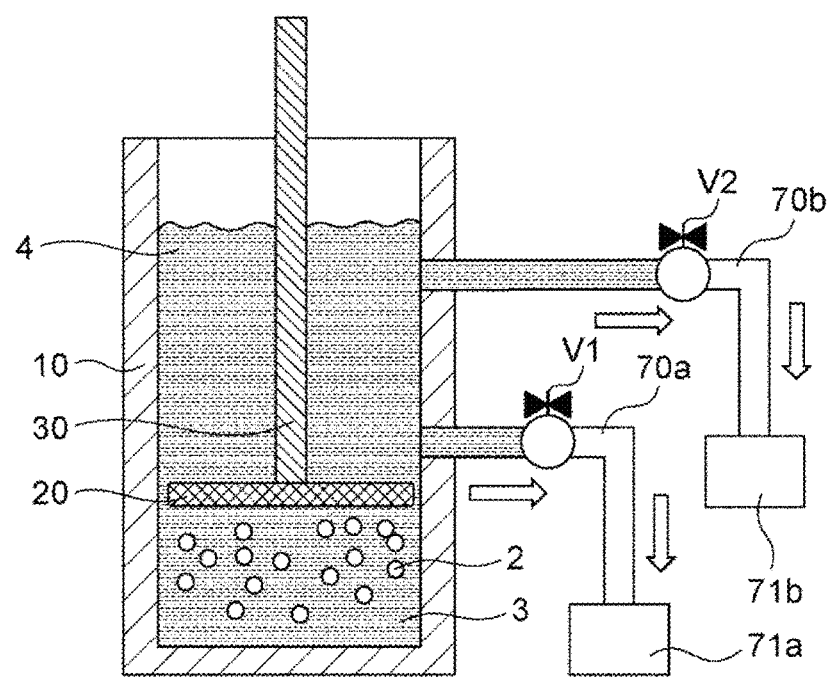
FIG. 23 is a schematic cross-sectional view illustrating a configuration of a concentration device of a modification of Embodiment 12 according to the present invention.
Figure 23:
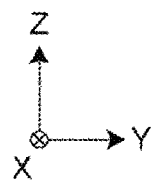

FIG. 23 is a schematic view illustrating a configuration of a concentration device 1LA of a modification of Embodiment 12 according to the present invention. As illustrated in FIG. 23, the concentration device 1LA may include a first discharge flow path 70a, a second discharge flow path 70b, a first discharge liquid tank 71a, and a second discharge liquid tank 71b.

One end of the first discharge flow path 70a is connected to the side wall of the container 10, and the other end of the first discharge flow path 70a is connected to the first discharge liquid tank 71a. In addition, the valve V1 is disposed in the first discharge flow path 70a.

One end of the second discharge flow path 70b is connected to the side wall of the container 10, and the other end of the second discharge flow path 70b is connected to the second discharge liquid tank 71b. In addition, a valve V2 is disposed in the second discharge flow path 70b. The connection position between the second discharge flow path 70b and the container 10 is located at a position higher than the connection position between the first discharge flow path 70a and the container 10.

In the concentration device 1LA, by providing the plurality of discharge flow paths, the discharge flow path can be properly used in accordance with change in the position of the filter 20. Accordingly, the discharge liquid amount can be controlled in accordance with the liquid amount of the liquid 3 to be concentrated. That is, by properly using the plurality of discharge flow paths in accordance with the liquid amount of the liquid 3 to be concentrated, the concentration ratio can be controlled with ease.

As an example, an example will be described in which the first discharge flow path 70a is connected to the side wall of the container 10 at a position of a height where the liquid amount in the container 10 becomes 100 ml, and the second discharge flow path 70b is connected to the side wall of the container 10 at a position of a height where the liquid amount in the container 10 becomes 200 ml.

When 300 ml of the liquid 3 is stored in the container 10, the valve V1 of the first discharge flow path 70a is opened, and the valve V2 of the second discharge flow path 70b is closed. With this, 200 ml of the liquid 4 can be discharged through the first discharge flow path 70a, and 100 ml of the liquid 3 can be left inside the container 10. That is, the concentration ratio of three times can be obtained.

Alternatively, the valve V1 of the first discharge flow path 70a is closed, and the valve V2 of the second discharge flow path 70b is opened. In this case, 100 ml of the liquid 4 can be discharged through the second discharge flow path 70b, and 200 ml of the liquid 3 can be left inside the container 10. That is, the concentration ratio of 1.5 times can be obtained.

Embodiment 13

A concentration device of Embodiment 13 according to the present invention will be described.

In Embodiment 13, points different from those in Embodiment 12 will be mainly described. In Embodiment 13, the same or equivalent configurations as those in Embodiment 12 will be described with the same reference numerals. In addition, in Embodiment 13, descriptions overlapping with those in Embodiment 12 will be omitted.

Embodiment 13 is different from Embodiment 12 in that a supply flow path and a supply tank are included.

Figure 24:
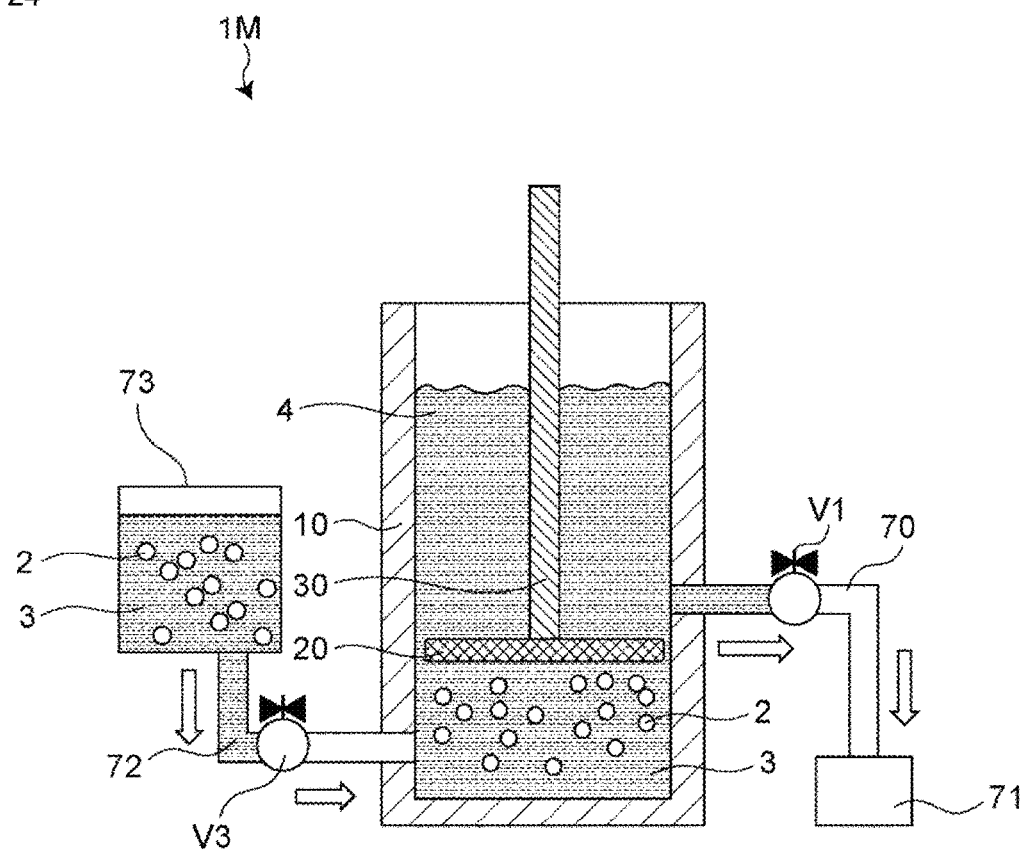
FIG. 24 is a schematic cross-sectional view illustrating an example of a configuration of a concentration device of Embodiment 13 according to the present invention.

FIG. 24 is a schematic cross-sectional view illustrating part of an example of a configuration of a concentration device 1M of Embodiment 13 according to the present invention. As illustrated in FIG. 24, the concentration device 1M includes a supply flow path 72 and a supply tank 73.

<Supply Flow Path>

The supply flow path 72 is a flow path that is provided at the side wall of the container 10 and communicates with the inside of the container 10. The supply flow path 72 communicates with the inside of the container 10 below the discharge flow path 70. In Embodiment 13, one end of the supply flow path 72 is connected to the side wall of the container 10, and the other end of the supply flow path 72 is connected to the supply tank 73. The connection position between the supply flow path 72 and the side wall of the container 10 is lower than the connection position between the discharge flow path 70 and the side wall of the container 10. In Embodiment 13, the connection position between the supply flow path 72 and the side wall of the container 10 is located in the vicinity of the bottom portion of the container 10. When the supply flow path 72 is located in the vicinity of the bottom portion, by supply of the liquid through the supply flow path 72, an effect of stirring the portion below the filter 20 is obtained.

Through the supply flow path 72, the liquid 3 containing the target objects 2 stored in the supply tank 73 is supplied to the inside of the container 10. The supply flow path 72 is, for example, piping. In addition, a valve V3 is disposed in the supply flow path 72. The valve V3 controls the supply of the liquid from the supply tank 73 to the supply flow path 72.

<Supply Tank>

The supply tank 73 is a tank for storing the liquid 3 containing the target objects 2. The supply tank 73 is connected to the other end of the supply flow path 72.

In the concentration device 1M, for example, when the filter 20 is located at a higher position than the supply flow path 72, the valve V3 is opened, and the liquid 3 containing the target objects 2 stored in the supply tank 73 is supplied to the inside of the container 10 through the supply flow path 72.

As described above, the concentration device 1M includes the supply flow path 72 that is provided at the side wall of the container 10 and communicates, below the discharge flow path 70, with the inside of the container 10. Through the supply flow path 72, the liquid 3 containing the target objects 2 is supplied to the inside of the container 10. With this configuration, the liquid 3 containing the target objects 2 can be supplied to the inside of the container 10 with ease. Furthermore, by providing the supply flow path 72 below the discharge flow path 70, mixing of the target object 2 into the liquid 4 discharged through the discharge flow path 70 can be suppressed.

Note that in Embodiment 13, the example has been described in which the concentration device 1M includes the valve V3 and the supply tank 73, but the present invention is not limited thereto. It is sufficient that the concentration device 1M includes the supply flow path 72. Furthermore, the supply tank 73 is preferably disposed at a position as high as possible vertically with respect to the container 10. The liquid in the supply tank 73 can be supplied to the container 10 by using gravity.

In Embodiment 13, the example has been described in which the concentration device 1M includes one supply flow path 72, but the present invention is not limited thereto. The concentration device 1M may include one or more supply flow paths 72. In this case, the one or plurality of supply flow paths 72 is provided on the loser side than any of the one or plurality of the discharge flow paths 70.

In Embodiment 13, the container 10 and the supply flow path 72 may be connected to each other by an aseptic connector. This makes it possible to configure an aseptic closed system.

Embodiment 14

A concentration device of Embodiment 14 according to the present invention will be described.

In Embodiment 14, points different from those in Embodiment 13 will be mainly described. In Embodiment 14, the same or equivalent configurations as those in Embodiment 13 will be described with the same reference numerals. In addition, in Embodiment 14, descriptions overlapping with those in Embodiment 13 will be omitted.

Embodiment 14 is different from Embodiment 13 in that a washing liquid flow path and a washing liquid tank are included.

Figure 25:
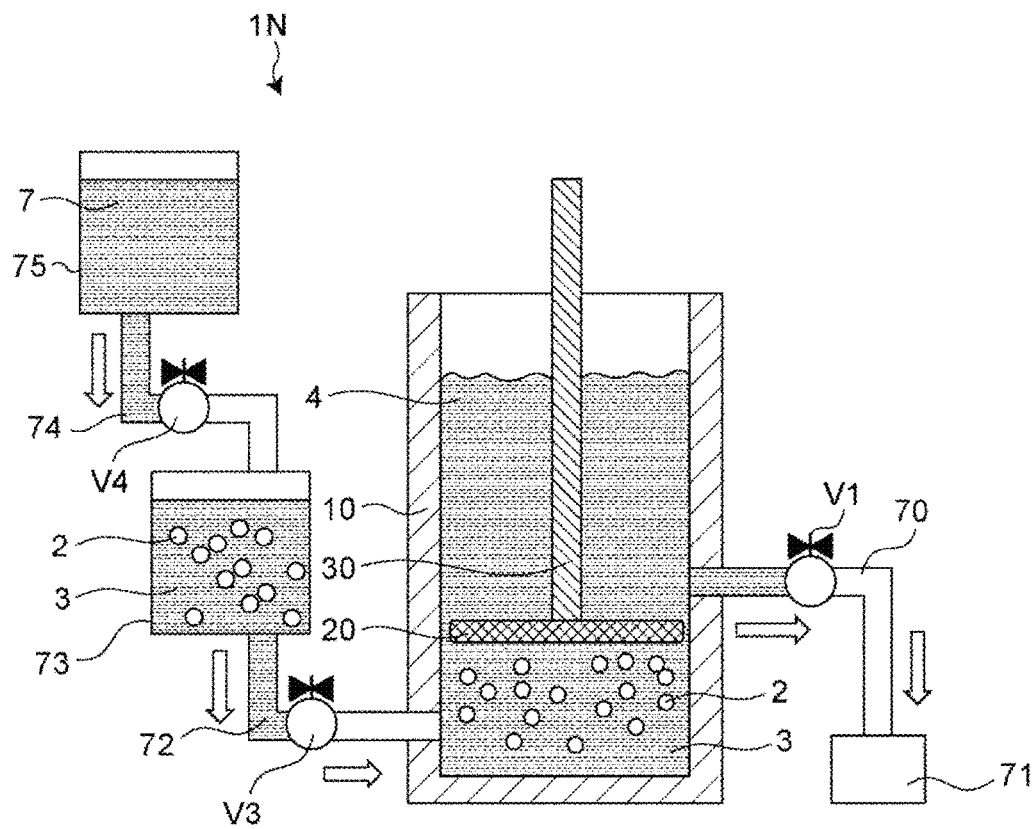
FIG. 25 is a schematic cross-sectional view illustrating an example of a configuration of a concentration device of Embodiment 14 according to the present invention.

FIG. 25 is a schematic cross-sectional view illustrating part of an example of a configuration of a concentration device 1N of Embodiment 14 according to the present invention. As illustrated in FIG. 25, the concentration device 1N includes a washing liquid flow path 74 and a washing liquid tank 75.

<Washing Liquid Flow Path>

The washing liquid flow path 74 is a flow path through which washing liquid 7 stored in the washing liquid tank 75 is supplied to the supply tank 73. In Embodiment 14, one end of the washing liquid flow path 74 is connected to the supply tank 73, and the other end of the washing liquid flow path 74 is connected to the washing liquid tank 75.

The washing liquid flow path 74 is, for example, piping. In addition, a valve V4 is disposed in the washing liquid flow path 74. The valve V4 controls supply of the washing liquid 7 from the washing liquid tank 75 to the supply tank 73.
<Washing Liquid Tank>

The washing liquid tank 75 is a tank for storing washing liquid. The washing liquid tank 75 is connected to the other end of the washing liquid flow path 74.

In the concentration device 1N, for example, the valve V4 is opened, and the washing liquid 7 stored in the washing liquid tank 75 is supplied to the inside of the supply tank 73 through the washing liquid flow path 74.

As described above, the concentration device 1N includes the washing liquid flow path 74 connected to the supply tank 73. Through the washing liquid flow path 74, the washing liquid 7 is supplied to the supply flow path 72 through the supply tank 73. With this configuration, a residual liquid of the liquid 3 containing the target objects 2 supplied to the inside of the container 10 through the supply flow path 72 from the supply tank 73 can be reduced.

Note that in Embodiment 14, the example has been described in which the concentration device 1N includes the valve V4 and the washing liquid tank 75, but the present invention is not limited thereto. It is sufficient that the concentration device 1N includes the washing liquid flow path 74.

In Embodiment 14, the example has been described in which the concentration device 1N includes one washing liquid flow path 74, but the present invention is not limited thereto. The concentration device 1N may include one or more washing liquid flow paths 74.

In Embodiment 14, the example has been described in which the washing liquid flow path 74 is connected to the supply tank 73, but the present invention is not limited thereto. For example, the washing liquid flow path 74 may be connected to the supply flow path 72. By the washing liquid flow path 74 being connected to the supply flow path 72, the residual liquid of the liquid 3 remaining in the supply flow path 72 can be further reduced.

Figure 26:
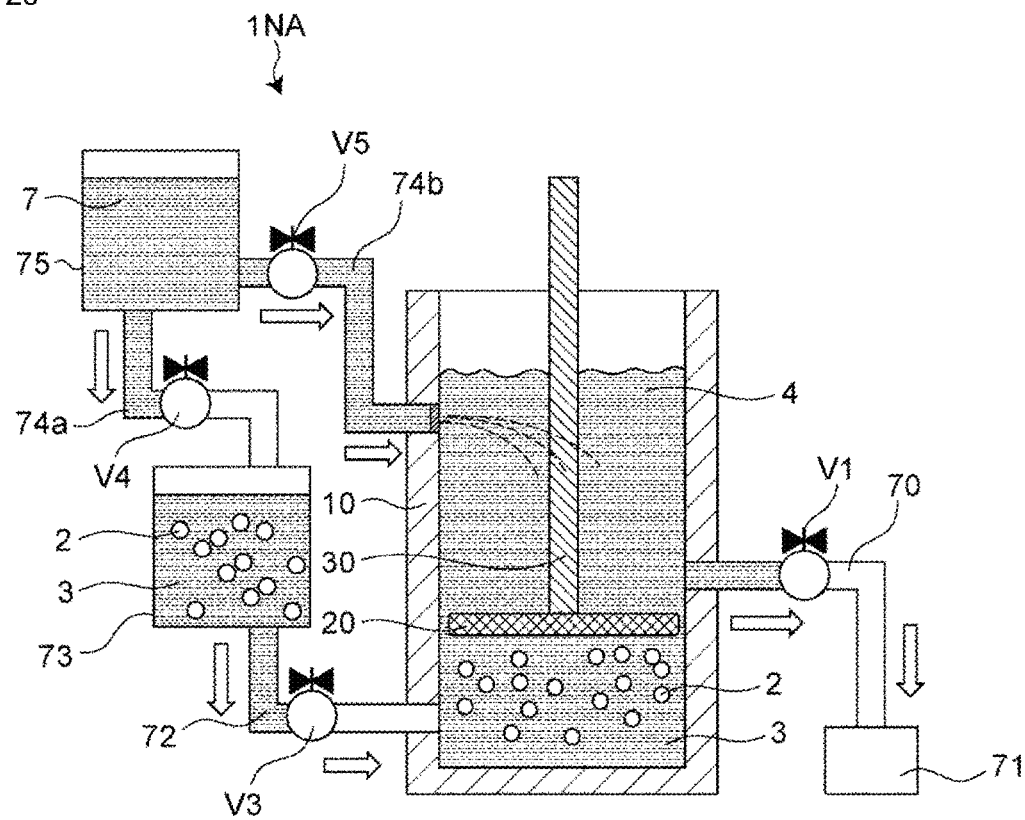
FIG. 26 is a schematic cross-sectional view illustrating a configuration of a concentration device of a modification of Embodiment 14 according to the present invention.

FIG. 26 is a schematic cross-sectional view illustrating a configuration of a concentration device 1NA of a modification of Embodiment 14 according to the present invention. As illustrated in FIG. 26, the concentration device 1NA may include a first washing liquid flow path 74a, a second washing liquid flow path 74b, and the washing liquid tank 75.

One end of the first washing liquid flow path 74a is connected to the supply tank 73, and the other end of the first washing liquid flow path 74a is connected to the washing liquid tank 75. In addition, the valve V4 is disposed in the first washing liquid flow path 74a.

One end of the second washing liquid flow path 74b is connected to the side wall of the container 10, and the other end of the second washing liquid flow path 74b is connected to the washing liquid tank 75. In addition, a valve V5 is disposed in the second washing liquid flow path 74b. The connection position between the second washing liquid flow path 74b and the container 10 is located at a position higher than the connection position between the discharge flow path 70 and the container 10 and the connection position between the supply flow path 72 and the container 10.

In the concentration device 1NA, the washing liquid 7 can be supplied from the washing liquid tank 75 to the inside of the container 10 through the second washing liquid flow path 74b. With this configuration, the target objects 2 sticking to the container 10 can be moved to the bottom portion of the container 10 by the washing liquid 7. As a result, the recovery rate of the target objects 2 is improved.

By disposing a shower head at the one end of the second washing liquid flow path 74b, the washing liquid 7 can be diffused and supplied to the inside of the container 10. As a result, the recovery rate of the target object 2 can be further improved.

Embodiment 15

A concentration device of Embodiment 15 according to the present invention will be described.

In Embodiment 15, points different from those in Embodiment 1 will be mainly described. In Embodiment 15, the same or equivalent configurations as those in Embodiment 1 will be described with the same reference numerals. In addition, in Embodiment 15, descriptions overlapping with those in Embodiment 1 will be omitted.

Embodiment 15 is different from Embodiment 1 in that a recovery flow path and a recovery tank are included.

Figure 27:
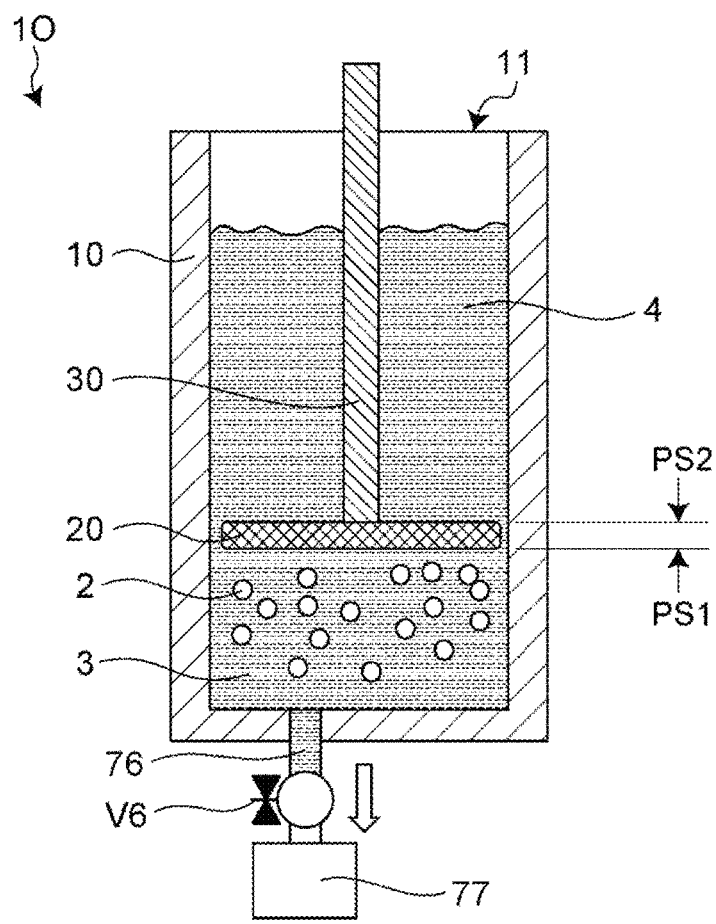
FIG. 27 is a schematic cross-sectional view illustrating an example of a configuration of a concentration device of Embodiment 15 according to the present invention.

FIG. 27 is a schematic cross-sectional view illustrating part of an example of a configuration of a concentration device 1O of Embodiment 15 according to the present invention. As illustrated in FIG. 27, the concentration device 1O includes a recovery flow path 76 and a recovery tank 77.
<Recovery Flow Path>

The recovery flow path 76 is a flow path that is provided at the lower portion of the container 10 and communicates with the inside of the container 10. The lower portion of the container 10 includes the bottom portion of the container 10 and the side wall close to the bottom portion side of the container 10. In Embodiment 15, one end of the recovery flow path 76 is connected to the bottom portion of the container 10, and the other end of the recovery flow path 76 is connected to the recovery tank 77.

The recovery flow path 76 is, for example, piping. In addition, a valve V6 is disposed in the recovery flow path 76. The valve V6 controls inflow of the liquid 3 containing the target objects 2 from the container 10 to the recovery tank 77. That is, by opening the valve V6, the liquid 3 containing the target objects 2 stored in the container 10 is recovered as a recovery liquid into the recovery tank 77 through the recovery flow path 76.
<Recovery Tank>

The recovery tank 77 is a tank for storing the liquid 3 containing the target objects 2 stored in the container 10 as the recovery liquid. The recovery tank 77 is connected to the other end of the recovery flow path 76.

In the concentration device 1O, for example, the valve V6 is opened, and the liquid 3 containing the target objects 2 stored in the container 10 is recovered as the recovery liquid into the recovery tank 77 through the recovery flow path 76.

As described above, the concentration device 1O includes the recovery flow path 76 that is provided at the bottom portion of the container 10 and communicates with the inside of the container 10. Through the recovery flow path 76, the liquid 3 containing the target objects 2 inside the container 10 is recovered. With this configuration, the liquid 3 containing the target objects 2 inside the container 10 can be recovered with ease.

Note that in Embodiment 15, the example has been described in which the concentration device 1O includes the valve V6 and the recovery tank 77, but the present invention is not limited thereto. It is sufficient that the concentration device 1O includes the recovery flow path 76. Alternatively, the concentration device 1O may include, instead of the recovery tank 77, for example, a syringe or the like as a recovery tool. It is possible to recover a constant amount of liquid by using a recovery tool, such as a syringe.

In Embodiment 15, the example has been described in which the concentration device 1O includes one recovery flow path 76, but the present invention is not limited thereto. The concentration device 1O may include one or a plurality of recovery flow paths 76.

In Embodiment 15, the example has been described in which the recovery flow path 76 is provided at the bottom portion of the container 10, but the present invention is not limited thereto. It is sufficient that the recovery flow path 76 is provided at a lower portion of the container 10. For example, the recovery flow path 76 may be provided, below the discharge flow path 70, at the side wall of the container 10.

Embodiment 16

A concentration device of Embodiment 16 according to the present invention will be described.

In Embodiment 16, points different from those in Embodiment 15 will be mainly described. In Embodiment 16, the same or equivalent configurations as those in Embodiment 15 will be described with the same reference numerals. In addition, in Embodiment 16, descriptions overlapping with those in Embodiment 15 will be omitted.

Embodiment 16 is different from Embodiment 15 in that the bottom portion of the container is provided with an inclined portion and in that the discharge flow path and the discharge liquid tank are included.

Figure 28:
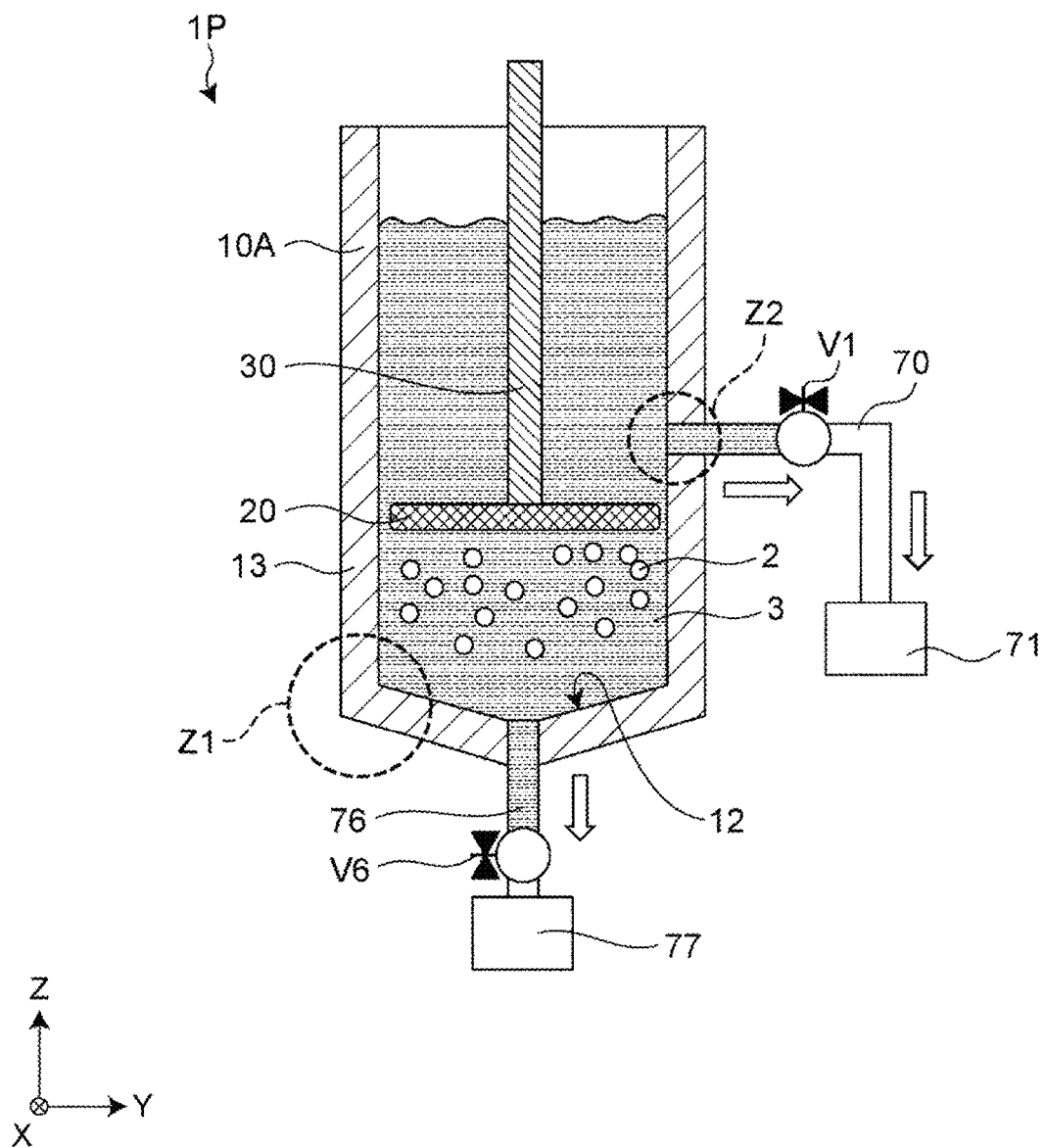
FIG. 28 is a schematic cross-sectional view illustrating an example of a configuration of a concentration device of Embodiment 16 according to the present invention.

FIG. 28 is a schematic cross-sectional view illustrating part of an example of a configuration of a concentration device 1P of Embodiment 16 according to the present invention. As illustrated in FIG. 28, in the concentration device 1P, a bottom portion of a container 10A is provided with an inclined portion 12. Furthermore, the concentration device 1P includes the discharge flow path 70 and the discharge liquid tank 71. Note that the discharge flow path 70 and the discharge liquid tank 71 are the same as those in Embodiment 12, and thus descriptions thereof will be omitted.

<Inclined Portion>

The inclined portion 12 is a portion inclined toward the recovery flow path 76 at the bottom portion of the container 10A. In Embodiment 16, the one end of the recovery flow path 76 is connected to the center of the bottom portion of the container 10A. Accordingly, the inclined portion 12 is inclined such that the center of the bottom portion of the container 10A is lowest. That is, the inclined portion 12 is lowered from a side wall 13 of the container 10A toward the center of the bottom portion.

As described above, in the concentration device 1P, the bottom portion of the container 10A is provided with the inclined portion 12 that is inclined toward the recovery flow path 76. With this configuration, since the liquid 3 containing the target objects 2 inside the container 10A flows to the recovery flow path 76 along the inclined portion 12, the liquid 3 containing the target objects 2 can be recovered with ease. In addition, sticking of the target objects 2 inside the container 10A can be reduced.

Figure 29:
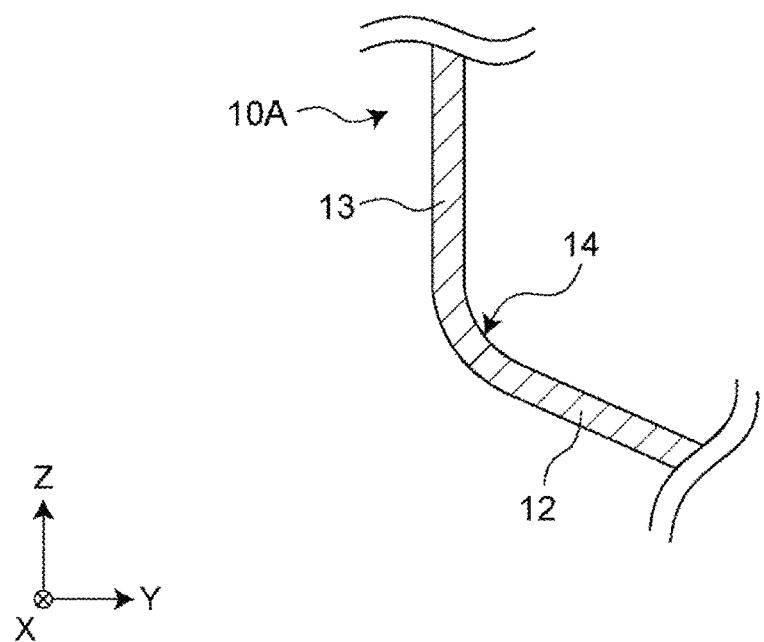
FIG. 29 is a schematic enlarged view of a Z1 portion in FIG. 28.

FIG. 29 is a schematic enlarged view of a Z1 portion in FIG. 28. As illustrated in FIG. 29, in the container 10A, a connection portion 14 between the side wall 13 and the inclined portion 12 is formed of a continuous curved surface. The "continuous curved surface" refers to a surface that has no steps and is a smooth surface, and is a surface which gradually changes. With this configuration, at the connection portion 14, sticking of the target objects 2 and the liquid 3 can be reduced.

Figure 30:
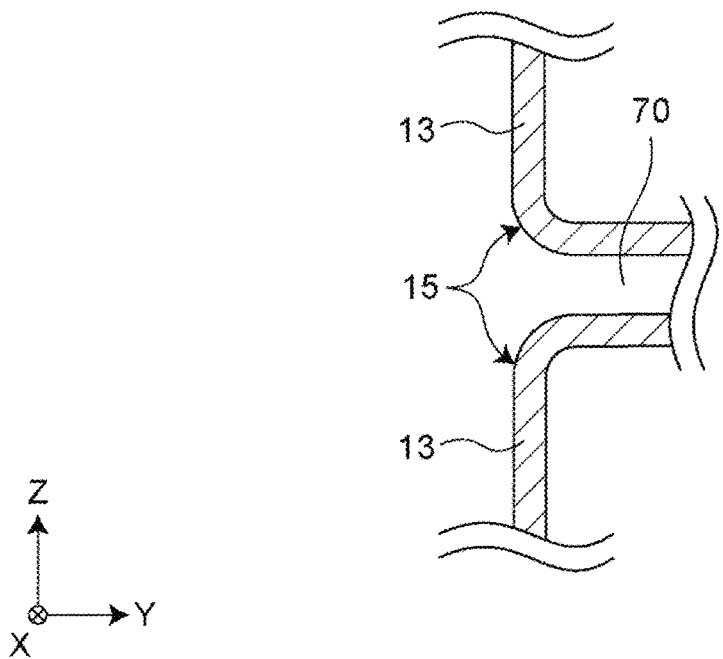
FIG. 30 is a schematic enlarged view of a Z2 portion in FIG. 28.

FIG. 30 is a schematic enlarged view of a Z2 portion in FIG. 28. As illustrated in FIG. 30, a connection portion 15 between the side wall 13 of the container 10A and the discharge flow path 70 is formed of a continuous curved surface. With this configuration, at the connection portion 15, sticking of the target objects 2 and the liquid 3 can be reduced.

Note that in Embodiment 16, the example has been described in which the recovery flow path 76 is connected to the center of the bottom portion of the container 10A, and the inclined portion 12 is inclined so as to be lowered toward the center of the bottom portion of the container 10A, but the present invention is not limited thereto. For example, the recovery flow path 76 may be connected to the bottom portion of the container 10A in the vicinity of the side wall 13 of the container 10A. In this case, the inclined portion 12 may be inclined so as to be lowered toward the side wall 13 of the container 10A.

Embodiment 17

A concentration device of Embodiment 17 according to the present invention will be described.

In Embodiment 17, points different from those in Embodiment 1 will be mainly described. In Embodiment 17, the same or equivalent configurations as those in Embodiment 1 will be described with the same reference numerals. In addition, in Embodiment 17, descriptions overlapping with those in Embodiment 1 will be omitted.

Embodiment 17 is different from Embodiment 1 in that a scale is provided on the side surface of the container.

Figure 31:
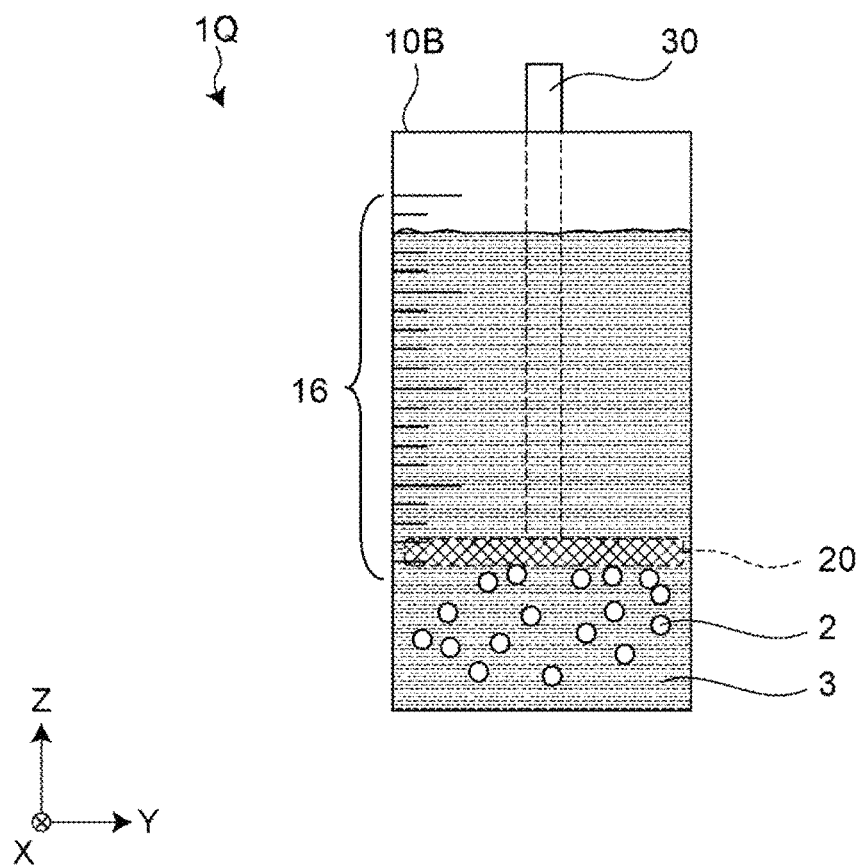
FIG. 31 is a schematic view illustrating an example of a configuration of a concentration device of Embodiment 17 according to the present invention.

FIG. 31 is a schematic view illustrating part of an example of a configuration of a concentration device 1Q of Embodiment 17 according to the present invention. As illustrated in FIG. 31, in the concentration device 1Q, the side surface of a container 10B is provided with a scale 16.

<Scale>

The side surface of the container 10B is provided with the scale 16. The scale 16 indicates the liquid amount inside the container 10B. In Embodiment 17, the container 10B is formed of a transparent member. With this, the liquid 3 inside the container 10B can be visually confirmed.

As described above, the concentration device 1Q includes the scale that is provided at the container 10B and indicates the liquid amount inside the container 10B. With this configuration, the liquid amount of the liquid 3 stored inside the container 10B can be grasped with ease. This makes it easy to perform concentration to a desired liquid amount.

Embodiment 18

A concentration device of Embodiment 18 according to the present invention will be described.

The concentration device of Embodiment 18 includes the constituent elements of Embodiments 12, 13, 15, and 16 in addition to the constituent elements of Embodiment 2. In Embodiment 18, the same or equivalent configurations as those in Embodiments 2, 12, 13, 15, and 16 will be described with the same reference numerals. In addition, in Embodiment 18, descriptions overlapping with those in Embodiments 2, 12, 13, 15, and 16 will be omitted.

Figure 32:
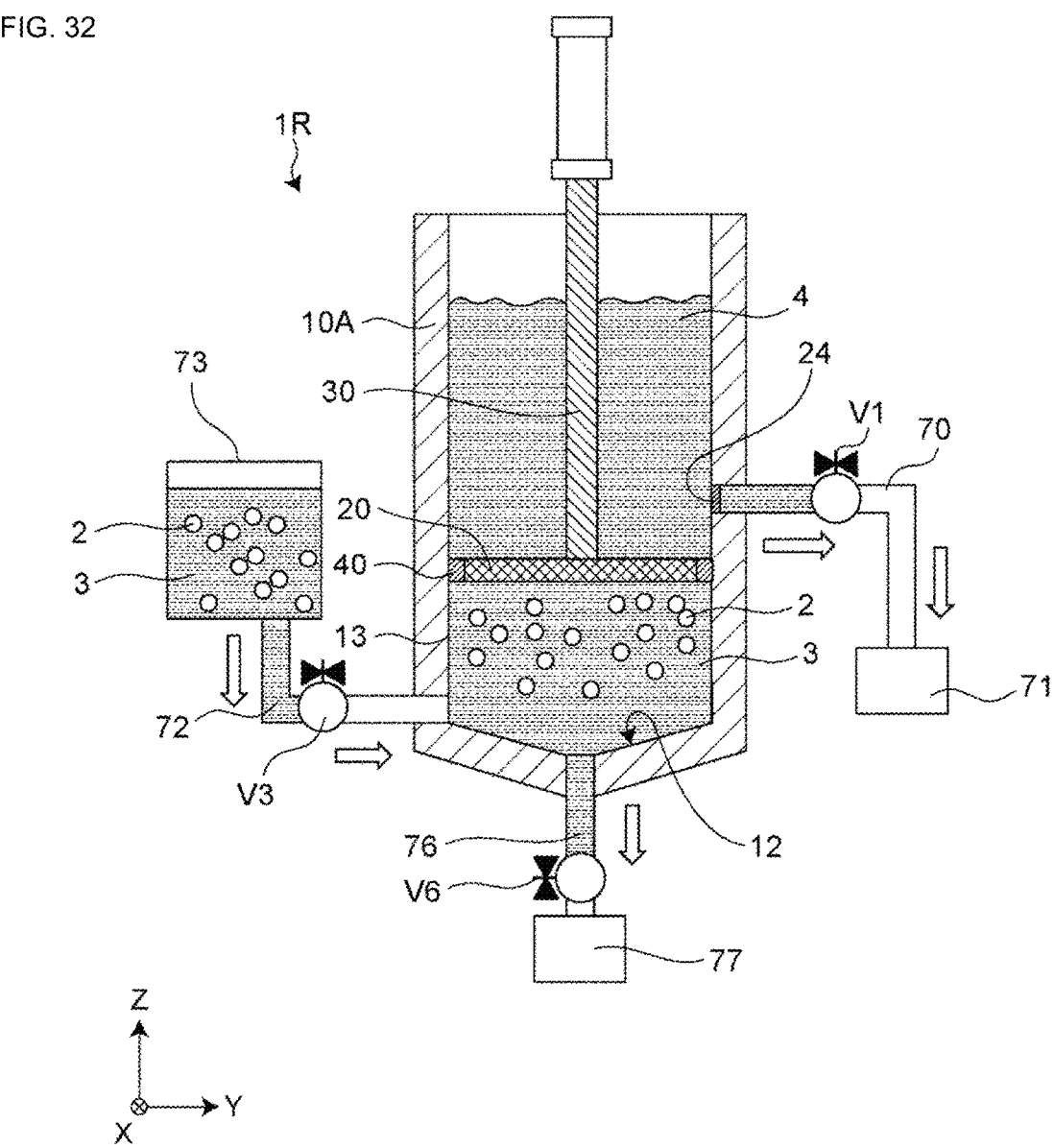
FIG. 32 is a schematic view illustrating an example of a configuration of a concentration device of Embodiment 18 according to the present invention.

FIG. 32 is a schematic view illustrating an example of a configuration of a concentration device 1R of Embodiment 18 according to the present invention. As illustrated in FIG.

32, the concentration device 1R includes the discharge flow path 70, the discharge liquid tank 71, the supply flow path 72, the supply tank 73, the recovery flow path 76, and the recovery tank 77. In the concentration device 1R, the bottom portion of the container 10A is provided with the inclined portion 12. The outer peripheral portion of the filter 20 is provided with the seal portion 40.

In Embodiment 18, a filter 24 is disposed to the discharge flow path 70. The filter 24 removes the target objects 2 and causes the liquid 4 to flow into the discharge flow path 70.

Figure 33:
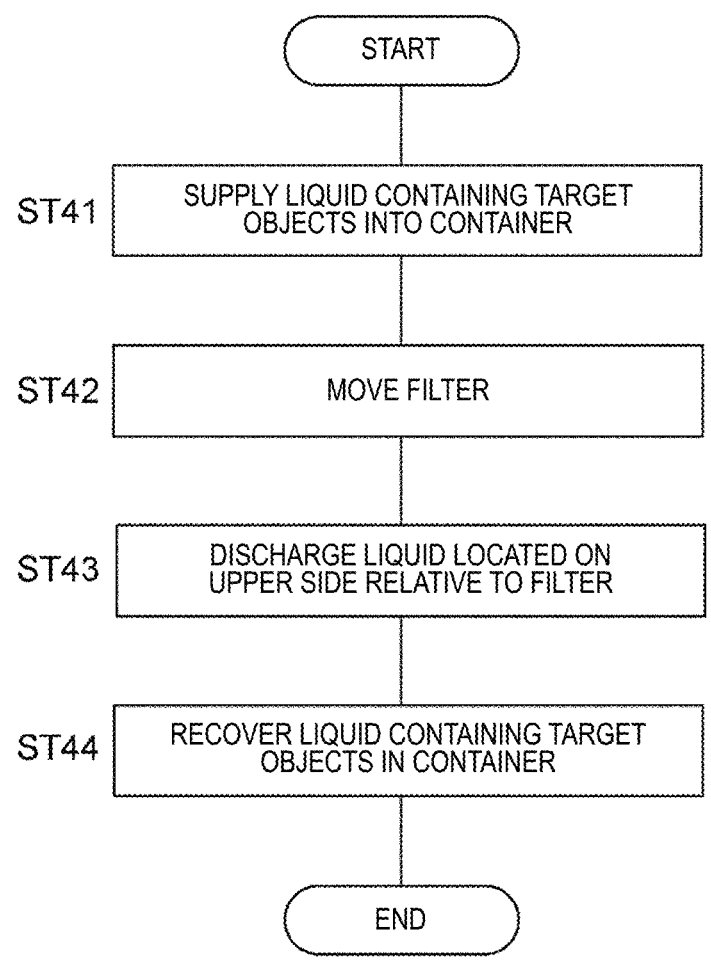
FIG. 33 is a flowchart illustrating an example of a concentration method of Embodiment 18 according to the present invention.

Next, an example of an operation (concentration method) of the concentration device 1R will be described. FIG. 33 is a flowchart illustrating an example of the concentration method of Embodiment 18 according to the present invention.

As illustrated in FIG. 33, in step ST41, the liquid 3 containing the target objects 2 is supplied into the container 10A. Specifically, the valve V3 is opened, and the liquid 3 containing the target objects 2 stored in the supply tank 73 is supplied into the container 10A through the supply flow path 72. At this time, the valves V1 and V6 are each in a closed state, and the liquid 3 does not flow into the discharge flow path 70 and the recovery flow path 76.

In step ST42, the filter 20 is moved. Specifically, after the valve V3 is closed and the supply of the liquid 3 containing the target objects 2 is stopped, the position control portion 30 moves the filter 20 downward. The position control portion 30 moves the filter 20 to a position below the inlet of the discharge flow path 70. Note that the filter 20 may be moved not only downward but also upward, or may be rotated, by the position control portion 30.

In step ST43, the liquid 4 located on the upper side relative to the filter 20 is discharged. Specifically, the valve V1 is opened, and the liquid 4 located on the upper side relative to the filter 20 is allowed to flow into the discharge flow path 70. As a result, the liquid 4 in the container 10A is sent to the discharge liquid tank 71 through the discharge flow path 70. The discharge of the liquid 4 is performed until no liquid 4 flows into the discharge flow path 70. This makes it possible to keep the liquid amount in the container 10A constant.

In step ST44, the liquid 3 containing the target objects 2 in the container 10A is recovered. Specifically, the valve V6 is opened, and the liquid 3 containing the target objects 2 stored in the container 10A is recovered as a recovery liquid into the recovery tank 77 through the recovery flow path 76.

As described above, in Embodiment 18, by performing steps ST41 to ST44, the liquid 3 containing the target objects 2 can be concentrated and the concentrated liquid can be recovered with ease.

In the concentration device 1R, the supply of the liquid 3 containing the target objects 2, the discharge of the liquid 4, and the recovery of the concentrated liquid can be performed with ease. Furthermore, the aseptic closed system can be easily made by connection or the like of the constituent elements using an aseptic connector or the like.

Embodiment 19

A concentration system of Embodiment 19 according to the present invention will be described.

The concentration system of Embodiment 19 includes a plurality of concentration devices. In the concentration system according to Embodiment 19, an example in which two concentration devices according to the modification of Embodiment 16 are included will be described. Note that in Embodiment 19, the same or equivalent configurations as those in Embodiment 16 will be described with the same reference numerals. In addition, in Embodiment 19, descriptions overlapping with those in Embodiment 16 will be omitted.

Figure 34:
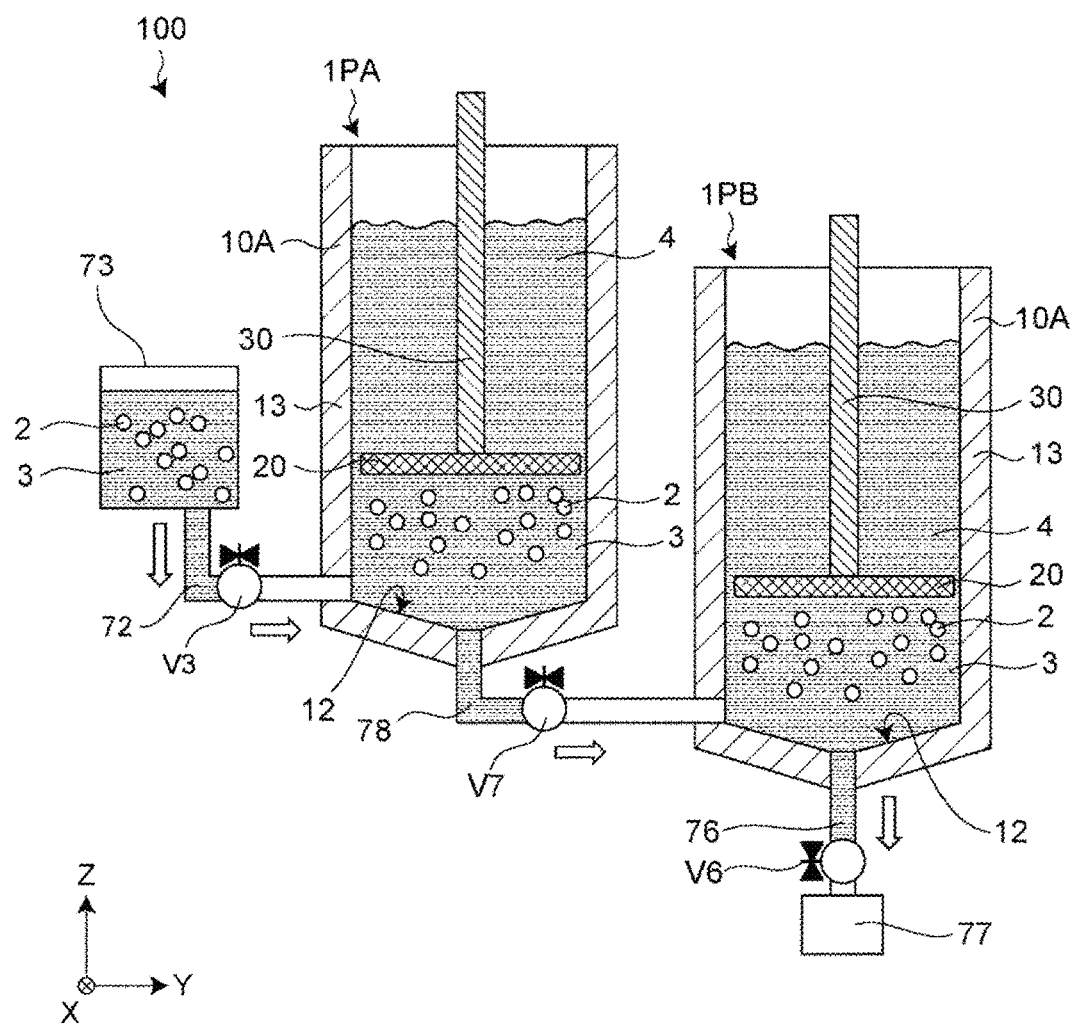
FIG. 34 is a schematic view illustrating an example of a configuration of a concentration system of Embodiment 19 according to the present invention.

FIG. 34 is a schematic view illustrating an example of a configuration of a concentration system 100 of Embodiment 19 according to the present invention. As illustrated in FIG. 34, the concentration system 100 includes a first concentration device 1PA, a second concentration device 1PB, and a connection flow path 78 that connects the first concentration device 1PA and the second concentration device 1PB to each other.

<First Concentration Device>

The first concentration device 1PA includes the container 10A, the filter 20, the position control portion 30, the supply flow path 72, and the supply tank 73. In the first concentration device 1PA, the one end of the supply flow path 72 is connected to the side wall 13 of the container 10A, and the other end of the supply flow path 72 is connected to the supply tank 73.

The connection flow path 78 is connected to the bottom portion of the container 10A of the first concentration device 1PA. In Embodiment 19, the connection flow path 78 is connected to the center of the bottom portion of the container 10A of the first concentration device 1PA. Furthermore, the bottom portion of the container 10A of the first concentration device 1PA is provided with the inclined portion 12 that is inclined so as to be lowered toward the connection flow path 78.

<Second Concentration Device>

The second concentration device 1PB includes the container 10A, the filter 20, the position control portion 30, the recovery flow path 76, and the recovery tank 77. In the second concentration device 1PB, the one end of the recovery flow path 76 is connected to the center of the bottom portion of the container 10A, and the other end of the recovery flow path 76 is connected to the recovery tank 77.

The connection flow path 78 is connected to the side wall 13 of the container 10A of the second concentration device 1PB. Furthermore, the bottom portion of the container 10A of the second concentration device 1PB is provided with the inclined portion 12 that is inclined so as to be lowered toward the recovery flow path 76.

<Connection Flow Path>

The connection flow path 78 is a flow path that connects the first concentration device 1PA and the second concentration device 1PB to each other. In Embodiment 19, one end of the connection flow path 78 is connected to the bottom portion of the container 10A of the first concentration device 1PA, and the other end of the connection flow path 78 is connected to the side wall 13 of the container 10A of the second concentration device 1PB.

The connection flow path 78 is, for example, piping. In addition, a valve V7 is disposed in the connection flow path 78. The valve V7 controls the movement of the liquid 3 containing the target objects 2 inside the container 10A of the first concentration device 1PA to the inside of the container 10A of the second concentration device 1PB.

As described above, in the concentration system 100, the first concentration device 1PA and the second concentration device 1PB are connected by the connection flow path 78, and the liquid 3 containing the target objects 2 can be concentrated stepwise. This makes it possible to fractionate and recover the target objects 2.

Note that in Embodiment 19, the example has been described in which the concentration system 100 includes the two concentration devices 1PA and 1PB, but the present invention is not limited thereto. The concentration system 100 may include two or more concentration devices.

In Embodiment 19, the example has been described in which the concentration system 100 includes the first concentration device 1PA and the second concentration device 1PB according to the modification of Embodiment 16, but the present invention is not limited thereto. The concentration system 100 may include the concentration device of Embodiments 1 to 18 and/or the concentration device of the modification of these embodiments.

In Embodiment 19, the example has been described in which the concentration system 100 includes one connection flow path 78, but the present invention is not limited thereto. The concentration system 100 may include one or a plurality of connection flow paths 78.

WORKING EXAMPLES

Working Example 1

As Working Example 1, concentration of a cell suspension was performed using the concentration device 1A of Embodiment 1. Conditions of the cell suspension used in Working Example 1 are shown in Table 1.

TABLE 1

| Cell | HL-60 |
|---|---|
| Cell Concentration | $4.8 \times 10^5$ cells/ml |
| Cell Average Size | 15.2 μm |
| Liquid Amount | 5 ml |
| The Number of Living Cells | $22.6 \times 10^5$ cells |

A cell suspension of the conditions shown in Table 1 was introduced into the container 10 of the concentration device 1A, and the filter 20 was lowered in the container 10. Note that the size of the through-hole 21 of the filter 20 is 6 μm. Furthermore, a liquid on the upper side of the filter 20 was sucked using an electric volumetric pipette, and taken as a discharge liquid. After concentration, a liquid in the container 10 was recovered and taken as a recovery liquid. The number of surviving cells was measured for each of the discharge liquid and the recovery liquid. For the measurement of the number of surviving cells, Countess II (manufactured by Thermo Fisher) was used, and the number of surviving cells was measured by the trypan blue staining method. Table 2 and Table 3 show the measurement results of the discharge liquid and the recovery liquid, respectively.

TABLE 2

| Discharge Liquid Amount | 2 ml |
|---|---|
| The Number of Living Cells in Discharge Liquid | $4.2 \times 10^5$ cells |

TABLE 3

| Recovery Liquid Amount | 2.8 ml |
|---|---|
| The Number of Living Cells in Recovery Liquid | $10.6 \times 10^5$ cells |

As shown in Table 2, the discharge liquid amount was 2 ml, and the number of living cells was $4.2 \times 10^5$ cells (cell concentration $2.2 \times 10^5$ cells/ml, living cell concentration 95%). Accordingly, 19% of the cell suspension was mixed in the discharge liquid. As shown in Table 3, the recovery liquid amount was 2.8 ml, and the number of living cells was $10.6 \times 10^5$ cells (cell concentration $4.4 \times 10^5$ cells/ml, living cell concentration 86%). Accordingly, the recovery rate was 47%.

As described above, the number of living cells and the cell concentration in the recovery liquid are higher than those in the discharge liquid, and when the concentration device 1A is used, it is possible to easily achieve extraction of the solvent and concentration and recovery of the cell suspension.

Figure 35:
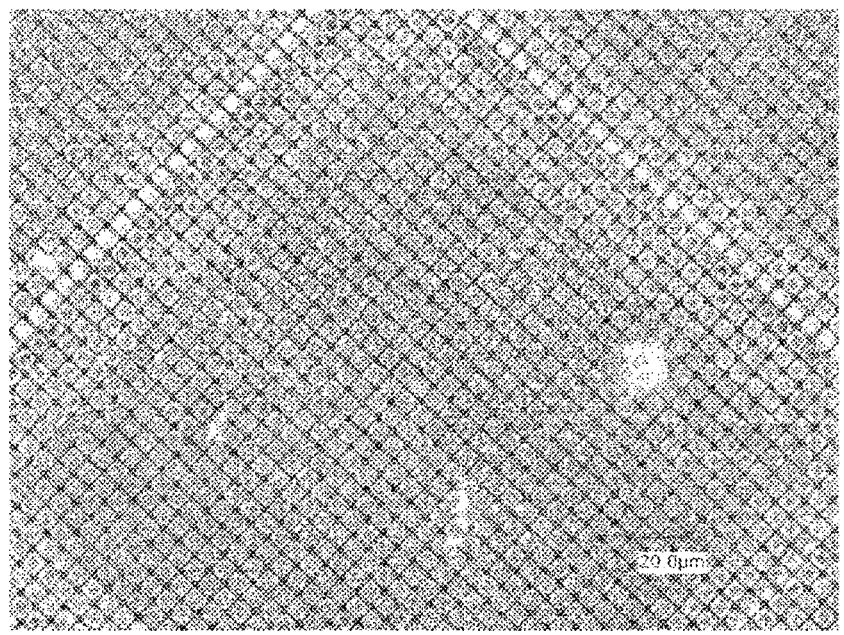
FIG. 35 is a photograph of a filter after concentration treatment in Working Example 1.

FIG. 35 is a photograph of the filter 20 after the concentration treatment in Working Example 1. As shown in FIG. 35, as a result of observing the filter under a microscope after the concentration treatment was performed using the concentration device 1A, no remarkable clogging could be confirmed.

Working Example 2

A cell suspension of conditions shown in Table 4 was introduced into the container 10A of the concentration device 1R through the flow path 72, and the filter 20 was lowered in the container 10A. Note that the bottom portion of the container is provided with the inclined portion 12, and the maximum value of the inner diameter of the container is 40 mm, and the minimum value of the inner diameter of the bottom portion of the container is 10 mm. Furthermore, the filter 20 was held by the shaft illustrated in FIG. 28. Furthermore, the lowering speed of the filter 20 was 300 mm/min, and the size of the through-hole 21 of the filter 20 was 6 μm. The filter 20 was moved to a position 10 mm below the discharge flow path 70, and then moved upward 5 mm and stopped. Thereafter, the valve V1 was opened and a discharge liquid was obtained in the discharge liquid tank 71. After confirming that there was no flow rate of the liquid 4 flowing into the discharge flow path 70, the valve V6 was opened, and a recovery liquid was obtained in the recovery tank 77. Finally, the number of surviving cells was measured for each of the discharge liquid and the recovery liquid. For the measurement of the number of surviving cells, Countess II (manufactured by Thermo Fisher) was used, and the number of surviving cells was measured by the trypan blue staining method. Table 5 and Table 6 show the measurement results of the discharge liquid and the recovery liquid, respectively.

TABLE 4

| Cell | HL-60 |
|---|---|
| Cell Concentration | $5.63 \times 10^5$ cells/ml |
| Cell Average Size | 14.8 μm |
| Liquid Amount | 60 ml |
| The Number of Living Cells | $33.8 \times 10^6$ cells |

TABLE 5

| Cell Concentration | $0.56 \times 10^5$ cells/ml |
|---|---|
| Discharge Liquid Amount | 41 ml |
| The Number of Living Cells in Discharge Liquid | $2.3 \times 10^6$ cells |

TABLE 6

| Cell Concentration | $16.6 \times 10^5$ cells/ml |
|---|---|
| Recovery Liquid Amount | 18 ml |
| The Number of Living Cells in Recovery Liquid | $29.9 \times 10^6$ cells |

As shown in Table 5, 6.8% of the cell suspension was mixed in the discharge liquid. As shown in Table 6, the recovery liquid amount was 18 ml, the recovery rate was 88.5%, and the concentration rate in cell concentration was 2.95 times. Note that 1 ml of the liquid is a dead volume from the balance between input and output liquid amounts in Table 4 to Table 6. Furthermore, the working time from introducing the cell suspension into the container 10A of the concentration device 1R to obtaining the recovery liquid was four minutes.

As described above, the cell suspension could be concentrated and recovered in a short time and by a simple method. By performing the work in a short time as described above, particularly when the target object is an organism-derived substance, such as a cell, it is also effective to reduce stress on cells.

Although the present invention has been fully described in connection with the preferred embodiments with reference to the accompanying drawings, various changes and modifications are apparent to those skilled in the art. It is to be understood that such changes and modifications are included within the scope of the present invention as defined by the appended claims unless they depart therefrom.

The concentration device and the concentration method according to the present invention are useful, for example, for application of concentrating a cell suspension.

REFERENCE SIGNS LIST 1, 1A, 1B, 1BA, 1C, 1D, 1E, 1F, 1G, 1H, 1I, 1J, 1K, 1L, 1LA, 1M, 1N, 1O, 1P, 1PA, 1PB, 1Q, 1R CONCENTRATION DEVICE
2 TARGET OBJECT
3 LIQUID
4 LIQUID
5 GAS LAYER
6 FILTER
7 WASHING LIQUID
10, 10A, 10B CONTAINER
11 OPENING
12 INCLINED PORTION
13 SIDE WALL
14 CONNECTION PORTION
15 CONNECTION PORTION
16 SCALE
20, 20A, 20B FILTER
21 THROUGH-HOLE
22 FILTER BASE BODY PORTION
30 POSITION CONTROL PORTION
31 STIRRER
32 ATTACHMENT MEMBER
33 SHAFT
34 ACTUATOR
35 COVER
40 SEAL PORTION
41, 42 GASKET
50A, 50B, 50C, 50D, 50E FRAME BODY
51A, 51C FIRST HOUSING
51B, 51D SECOND HOUSING
52 FIRST PROTRUDING PORTION
53 SECOND PROTRUDING PORTION
60 SCREW
61 FIRST SCREW PORTION
62 SECOND SCREW PORTION
63 ADHESIVE
70, 70a, 70b DISCHARGE FLOW PATH
71 DISCHARGE LIQUID TANK
72 SUPPLY FLOW PATH
73 SUPPLY TANK
74, 74a, 74b WASHING LIQUID FLOW PATH
75 WASHING LIQUID TANK
76 RECOVERY FLOW PATH
77 RECOVERY TANK
78 CONNECTION FLOW PATH
100 CONCENTRATION SYSTEM

The invention claimed is:

1. A concentration device for concentrating a liquid containing a target object, the concentration device comprising:
a container configured to store a liquid containing a target object;
a filter in the container;
a shaft configured to change a position of the filter in the container;
one or more discharge flow paths extending through a side wall of the container;
one or more supply flow paths extending through the side wall of the container and located lower than any of the one or more discharge flow paths;
a supply tank connected to the one or more supply flow paths; and
a first washing liquid flow path connected to the supply tank and configured to supply a washing liquid to the supply tank, wherein
in a state where the liquid is stored in the container, a gas layer is present at a lower portion of the filter,
the filter is sized such that there is a gap between an outer peripheral surface of the filter and an inner surface of the container that allows the filter to move within the container, and the gap has a size that prevents the target object from passing through the gap,
through the one or more discharge flow paths, the liquid inside of the container is discharged to outside of the container, and
through the one or more supply flow paths, the liquid containing the target object is supplied to the inside of the container.

2. The concentration device according to claim 1, further comprising:
a frame body configured to hold the filter,
wherein the frame body includes a first housing and a second housing that fits together with the first housing, and
the filter is sandwiched and held between the first housing and the second housing.

3. The concentration device according to claim 2, wherein an inner wall of the first housing has a first screw portion,
an outer wall of the second housing has a second screw portion screwed onto the first screw portion.

4. The concentration device according to claim 1, further comprising:
an attachment member attached to the shaft.

5. The concentration device according to claim 1, further comprising:
a frame body configured to hold the filter,
wherein the filter contains at least one of a metal and a metal oxide as a main component thereof, and
the frame body includes a magnet that holds the filter by a magnetic force.

6. The concentration device according to claim 1, further comprising:
a frame body configured to hold the filter; and
an adhesive that fixes the filter to the frame body.

7. The concentration device according to claim 1, wherein the shaft is configured to move the filter up and down and/or rotationally in the container.

8. The concentration device according to claim 1, further comprising:
a stirrer attached to the shaft.

9. The concentration device according to claim 1, further comprising an actuator attached to the shaft, and a cover covering a portion of the shaft that is exposed from the container.

10. The concentration device according to claim 1, further comprising a second washing liquid flow path extending through the side wall of the container and configured to supply the washing liquid to the container.

11. The concentration device according to claim 1, further comprising:
a recovery flow path positioned at a lower portion of the container and configured to communicate with the inside of the container,
wherein, through the recovery flow path, the liquid containing the target object in the inside of the container is recovered.

12. The concentration device according to claim 11,
wherein the recovery flow path is located at a bottom portion of the container, and
the bottom portion of the container includes an inclined portion inclined toward the recovery flow path.

13. The concentration device according to claim 1, further comprising:
a scale configured to indicate an amount of the liquid inside of the container.

14. A concentration system comprising:
two or more concentration devices according to claim 1; and
one or more connection flow paths connecting the two or more concentration devices.

* * * * *